US006594278B1

(12) United States Patent
Baroudi

(10) Patent No.: US 6,594,278 B1
(45) Date of Patent: *Jul. 15, 2003

(54) APPARATUS FOR TRANSMITTING DELAY SENSITIVE INFORMATION OVER FRAME RELAY

(75) Inventor: Mihyar Baroudi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/087,829

(22) Filed: Mar. 1, 2002

Related U.S. Application Data

(63) Continuation of application No. 09/071,869, filed on May 1, 1998.

(51) Int. Cl.[7] .............................................. H04L 12/56
(52) U.S. Cl. ...................................... 370/466; 370/474
(58) Field of Search .............................. 370/465, 466, 370/474, 470, 471, 395.5, 395.52, 469

(56) References Cited

U.S. PATENT DOCUMENTS

| | | | |
|---|---|---|---|
| 4,771,425 A | 9/1988 | Baran et al. .................. 370/85 |
| 4,819,228 A | 4/1989 | Baran et al. .................. 370/85 |
| 4,903,261 A | 2/1990 | Baran et al. ................ 370/94.2 |
| 5,020,058 A | 5/1991 | Holden et al. ............... 370/109 |
| 5,214,645 A | 5/1993 | Hagiramim |
| 5,303,237 A | 4/1994 | Bergman et al. ........... 370/85.6 |
| 5,317,562 A | 5/1994 | Nardin et al. .................. 370/16 |
| 5,359,592 A | 10/1994 | Corbalis et al. .............. 370/17 |
| 5,408,472 A | 4/1995 | Hiuchyj et al. |
| 5,513,172 A | 4/1996 | Shikma et al. |
| 5,519,704 A | 5/1996 | Farinacci et al. ......... 370/85.13 |
| 5,570,361 A | 10/1996 | Norizuki et al. |
| 5,583,862 A | 12/1996 | Callon ......................... 370/397 |
| 5,598,581 A | 1/1997 | Daines et al. ................ 395/872 |
| 5,699,521 A | 12/1997 | Izuka et al. ............. 395/200.15 |
| 5,732,079 A | 3/1998 | Castrigno .................... 370/362 |
| 5,734,654 A | 3/1998 | Shirai et al. ................. 370/396 |
| 5,805,595 A | 9/1998 | Sharper et al. ............. 370/442 |
| 5,835,494 A | 11/1998 | Hughes et al. .............. 370/397 |
| 5,852,721 A | 12/1998 | Dillon et al. ........... 395/200.47 |
| 5,883,893 A | 3/1999 | Rumen et al. .............. 370/395 |
| 5,953,336 A | 9/1999 | Moore et al. ............... 370/395 |
| 6,055,236 A | 4/2000 | Nessett et al. .............. 370/389 |

FOREIGN PATENT DOCUMENTS

| | | | |
|---|---|---|---|
| WO | WO 93/07569 | 4/1993 | ........... G06F/13/40 |
| WO | WO 93/07692 | 4/1993 | ........... H04J/3/24 |
| WO | WO 94/01828 | 1/1994 | ........... G06F/15/40 |

OTHER PUBLICATIONS

Allen, M., "Novell IPX Over Various WAN Media (IPX-WAN)", Network Working Group, RFC 1551, Dec. 1993, pp. 2–22.

*Primary Examiner*—Ken Vanderpuye
(74) *Attorney, Agent, or Firm*—Thelen Reid & Priest LLP; David B. Ritchie; Marc S. Hanish

(57) ABSTRACT

A method of transmitting delay sensitive information over Internet Protocol (IP) over Frame Relay including storing the information in an IP packet, storing the IP packet in a sub-frame, storing a special symbol representing that the frame is delay sensitive in the sub-frame, storing the sub-frame in a frame, storing a network layer protocol identification representing that the frame contains IP information in the frame, and transmitting the frame over a Frame Relay Network, distinguishing delay sensitive information from non-delay sensitive information by examining the special symbol. Additionally, in systems using the FRF.12 or similar fragmenting standard, the special symbol may be stored in the header of the fragment.

79 Claims, 15 Drawing Sheets

APPARATUS FOR TRANSMITTING DELAY SENSITIVE INFORMATION OVER FRAME RELAY

This application is a continuation of Ser. No. 09/071,869, entitled "TRANSMITTING DELAY SENSITIVE INFORMATION OVER IP OVER FRAME RELAY", by Mihyar Baroudi, filed on May. 1, 1998.

BACKGROUND OF THE INVENTION

1. Field of the Invention

The present invention relates to the field of computer networking. More particularly, the present invention relates to a method for transmitting delay sensitive information over systems using both Internet Protocol and Frame Relay.

2. The Background Art

Modern computer networks are divided up into layers. Each layer is responsible for providing some service to the layer above it, and may use the services of the layer below it. The International Standards organization (ISO) defined seven layers as a standard for computer networks. This standard is depicted in FIG. 1 at reference numeral 10. The layers are defined as follows:

(1) A physical layer, which is responsible for transmitting unstructured bits of information across a link.
(2) A data link layer, which transmits chunks of information across a link.
(3) A network layer, which is responsible for ensuring that any pair of systems in the network can communicate with each other.
4) A transport layer, which establishes a reliable communications stream between a pair of systems.
(5) A session layer, which offers services above the simple full-duplex reliable communication stream provided by the transport layer.
(6) A presentation layer, which is responsible for providing a means by which applications can agree on representations of data.
(7) An application layer, which runs applications.

An increase in the use of the Internet in the 1970's made it necessary for a standard to be created for communications over the Internet. This was prompted by the fact that the Internet comprises what is essentially a huge number of smaller networks, each of the smaller networks possibly having different standards of communication. Therefore, the Internet Protocol Suite was created to establish a single standard of communicating over the Internet, while still allowing for individual networks to maintain their own standards of communications within their own networks.

The Internet Protocol Suite is depicted in FIG. 1 at reference numeral 12. It comprises several standards for many of the network layers defined by the ISO. The Internet Protocol Suite standard for use with the network layer is called the Internet Protocol (IP), depicted at reference numeral 14 of FIG. 1. IP provides fragmentation and reassembly of data as well as error reporting and, along with TCP, is the heart of the Internet Protocol Suite.

IP works by splitting up data into IP packets, or chunks of information which contain not only the data to be transmitted but a variety of other information about the data as well. The IP Packet format is depicted in FIG. 2. The IP packet 20 contains the following fields:

(1) Version 22, which indicates the version of IP currently used.
(2) IP Header Length (IHL) 24, which indicates the packet header length in 32-bit words.
(3) Type-of-Service 26, which specifies how the upper layer protocol wants the packet to be handled.
(4) Total length 28, which indicates the length in bytes of the entire packet, including the header and data.
(5) Identification 30, which contains an integer identifying the packet, allowing for packets to be reassembled upon delivery.
(6) Flags 32, which indicate whether the packet can be fragmented and whether the packet is the last fragment in a series of fragmented packets.
(7) Fragment Offset 34,
(8) Time-to-live 36, which maintains a counter which gradually decrements down to zero at which point the packet is discarded, which keeps packets from looping infinitely.
(9) Protocol 38, which indicates which upper-layer protocol should receive the packet after IP processing is complete.
(9) Header checksum 40, which helps ensure IP header integrity.
(10) Source address 42, which specifies the sending node.
(11) Destination address 44, which specifies the receiving node.
(12) Options 46, which allows IP to support carious options, such as security.
(13) Data 48, which contains the information itself.

IP remains the standard for network layer communication over the Internet even today. Additionally, many individual networks have also adopted the IP standard within their own network. IP remains the standard of choice for networks which utilize phone lines or other low speed, low reliability communications mediums, as it was designed with many safeguards to prevent errors.

Additionally, the use of IP packets allows a tremendous flexibility for a system to fragment data and send the packets in an order that maximizes efficiency. For example, if one user is sending an extremely large piece of information, while another was sending an extremely small piece of information, without fragmentation it would be possible for the user sending the extremely small piece of information to encounter an extremely large delay while the large piece of information was transmitted over the network. By fragmenting the large piece of information into packets, however, it is possible for the system to implement a feature wherein access to the bandwidth of the network is rotated evenly from user to user. This would mean that a portion of the large piece of information is sent, then the small piece of information is sent, then the rest of the large piece of information is sent. Thus, routers were designed with just such a feature, where access to the network was cycled between the users in equal doses.

A problem arises, however, in the transmission of voice, audio, video, or other delay sensitive information, over IP. IP was designed for the transmission of data, not voice. When transmitting data, delays, while annoying, normally do not affect the usefulness of the data. Unlike data, however, voice is delay sensitive. When talking on the phone, a delay of even a second between transmission and receipt can interrupt a conversation. In addition, there is a necessity in voice communication for two way simultaneous transmissions. For example, it is quite common for two people to speak at the same time during a conversation. Because of these requirements, it is necessary for voice to have simultaneous or near-simultaneous transmissions. Placing voice transmissions on the same level with data transmissions would result in ineffective voice transmission.

There are other types of delay sensitive information that are sometimes transmitted over networks. These can include such things as real-time video transmissions, interactive video game transmissions, and the like. Delay sensitive information is any information whose usefulness may be diminished significantly by delays in transmission. The main type of delay sensitive information is voice, but the same techniques used to handle voice information may be used to handle other types of delay sensitive information as well.

In order to remedy the problem of transmitting voice sensitive information over IP, two different solutions were developed. In the first, one of the type-of-service bits 26 is used to signify whether the data is delay sensitive or not. Thus, a network device supporting delay-sensitive transmission will look to this bit to determine what precedence to give the data in the queue holding data waiting for transmission over the network.

The second solution developed for the transmission of voice over IP involves the use of a Resource Reservation Protocol (RSVP). In these systems, in order to successfully transmit voice from one node to another, every node in the chain must be one that honors the RSVP system. Then, before transmission occurred, each node in the chain would be contacted and told to reserve a certain amount of bandwidth for the incoming transmission. After each node complied, the conversation could be initiated. FIG. 3 depicts an example of an IP network 60. For simplicity, this network 60 may be thought of as the Internet, with node A 62, node B 64, node C 66, and node D 68. These nodes 62, 64, 66, 68 may be Internet domains, each containing a subnetwork 70, 72, 74, 76 respectively. If a user at node A 62 wanted to engage in a voice conversation with a user at node D 68, then all of the nodes A, B, C, and D 62, 64, 66, 68 would have to honor RSVP requests. If this was the case, then each node 62, 64, 66, 68 would set aside the small bandwidth space for the conversation, at which point the conversation could begin. If any of the nodes in the chain did not honor RSVP requests, then this method would fail.

Voice over IP transmissions have proven to be effective with networks utilizing the IP standard. However, there are many networks which (at least internally) use other techniques instead of or in addition to IP. One of the most common of these techniques is Frame Relay.

Frame relay was designed in response to the increase in high speed, reliable, digital communications mediums. It was originally conceived as an interface for use over ISDN lines, however it has also gained acceptance in other high speed networks. Frame Relay provides for a very simple protocol, since error correcting capability need only be minimal given the high reliability of the communications medium. Additionally, frame relay provides a means for statistically multiplexing many logical data transmissions over a single physical transmission link. This is in sharp contrast to systems which use time-division-multiplexing for supporting multiple data streams. This statistical multiplexing along with the decrease error correcting capability provides more flexible and efficient use of available bandwidth.

FIG. 4 depicts the standard format for the header of a Frame Relay packet 80 (which in Frame Relay is referred to as a frame). The data link connection identifier (DLCI) 80 represents a logical connection that is multiplexed across a physical channel. The command/response (C/R) field 82 is not used by Frame relay but is used by certain applications. The extending address (EA) fields 84a, 84b are each set to 0 if more octets following in the header and 1 if this octet is the last in the header. Any octets beyond the two depicted will contain only DLCI information. The forward explicit congestion notification (FECN) field 86a is set by a network node that is experiencing congestion to notify the device that congestion avoidance procedures should be initiated, while the backward explicit congestion notification (BECN) field 86b informs the originator of the traffic of this condition. The discard eligibility (DE) field 88 is set to 1 if a frame can be disregarding should the system need to begin dropping frames in order to solve congestion problems. The address information is contained within the two-byte address field 84. The two-byte frame check sequence (FCS) field 86 contains characters added to the frame for error control purposes. Finally, data is contained in a variable length data field 88. The data contained in the frame follows this frame header. It is also possible to add a cyclic redundancy check (CRC) or frame check sequence (FCS) field following the data field to aid in error correction.

The inherent problem with this frame design, however, is that it lacks a field describing the delay sensitive or non-delay sensitive nature of the information stored in the data field. Therefore, all information is treated the same, whether it is delay sensitive (voice) or not delay sensitive (data). This issue, particularly the issue of transmitting voice over frame relay, was addressed by the Frame Relay Forum in the FRF.11 standard.

FRF.11 defined a sub-frame structure which could be used to transmit voice communications. The data field of each frame could then contain one or more of the subframes. This method is depicted in FIG. 5. In FIG. 5, voice samples 90a, 90b, and 90c are placed in the data fields of sub-frames 92a, 92b, and 92c respectively. Then each sub-frame 92a, 92b, 92c are placed in the information field of a frame 94. The same format is also used to transmit data communications. Data packet 96 is placed in subframe 98 which is then placed in the information field of frame 100.

The format of each sub-frame is depicted in FIG. 6. Each sub-frame 110 contains up to four different formats of octets (numbered 1, 2a, 2b, and 2c) of fields. Two of the octets (2b and 2c) are optional. The fields are as follows:

(1) An extension indication (EI) field 112, which is set to indicate the presence of octet 2a.

(2) A length indication (LI) field 114, which is set to indicate the presence of octet 2b (3) A sub-channel identification (CID) field 116, which indicates the local exchange identification information. This is generally a number between 0 and 255. One number represents data calls. Data calls only require one number to identify the local exchange information because they contain additional headers which represent destination address. Voice calls are each given a unique subchannel identification number (one that is not the number chosen to represent data calls). Thus, in most systems, it is possible to have up to 255 different voice transmissions executing simultaneously. This subchannel identification field may extend into octet 2a if it is present.

(4) A payload type field 118, which indicates the type of payload according to Table 1 illustrated below. The possible types of payload include primary payload transfer syntax (used for voice and data), dialed digit transfer syntax (used for transmitting the digit dialed on a push-button phone), signalling bit transfer syntax (used for standard protocols which are used to establish connection end to end, e.g. between a PBX and a switch or between two switches), fax relay transfer syntax (used for transmitting fax), and primary payload silence indication (used to transmit silence).

(5) Payload length 120, which indicates the number of payload octets following the header.

(6) Payload 122, which contains the data and may extend over more than one octet.

(7) Two unused bits 124a, 124b, which were reserved for some future use.

TABLE 1

| Bits | | | | |
|---|---|---|---|---|
| 1 | 2 | 3 | 4 | Payload Type |
| 0 | 0 | 0 | 0 | Primary payload transfer syntax |
| 0 | 0 | 0 | 1 | Dialed digit transfer syntax |
| 0 | 0 | 1 | 0 | Signalling bit transfer syntax |
| 0 | 0 | 1 | 1 | Fax relay transfer syntax |
| 0 | 1 | 0 | 0 | Primary payload silence indication |

Thus, for systems that wished to allow voice communications, the format was such that the system could examine each subframe and choose to treat is differently if it contained delay sensitive information rather than non-delay sensitive information (judging from the bits in the subchannel identification field 116). For example, a system may decide to give all delay sensitive information priority over non-delay sensitive information. Thus, anytime voice communications needed to be transmitted, the data communications would have to wait.

However, the FRF.11 standard had some drawbacks. The main drawback was the possibility of starvation of data communications. Starvation occurs when a piece of information is held in a queue for an infinite amount of time, not being allowed to travel across the network because it is considered lower priority information than that being transmitted. Since many systems implementing the FRF.11 standard gave voice communications top priority because of their delay-sensitive nature, there were occasions when data communication experienced long enough delays to create problems for the systems. FIG. 7 depicts an example of where such a situation could occur.

In FIG. 7, frame 132 contains an information field which contains several subframes 134a, 134b, 134c, 134d, 134e, 134f, and 134g. These subframes all contain voice transmissions. Frame 136, on the other hand contains subframe 138 which contains data information. If voice communications were given top priority over data communications, then frame 130 would have to wait to be transmitted until the entire frame 130 was transmitted over the network. Moreover, if another voice communication was placed in the queue before frame 130 was completely transmitted, then this new voice communication may also take precedence over frame 136. Recent FRF.11 systems have partially solved this problem by cycling between data communications and voice communications. In these systems, after frame 130 was transmitted over the network, then frame 136 would automatically be transmitted no matter what type of information has joined it in the queue. However, the problem of lengthy delays in transmitting small amounts of data still remained.

This problem was addressed by the FRF.12 standard. The FRF.12 standard was created with the realization that, while voice communications are delay sensitive, a small amount of delay can be encountered without creating a problem for these voice communications. It allows for the fragmenting of long IP packets into sequences of shorter sub-frames, which are then placed in frame for transport. It is preferable to place only one of the sub-frames from a particular sequence in each frame, otherwise the effect of fragmentation is diminished. It is, however, possible to place sub-frames from different sequences in the same frame. When the frames are received, the sub-frames are reassembled into the original IP packet. FRF.12 defined three separate fragmentation formats for different types of networks: UNI, NNI, and End-to-End fragmentation. The format for each sub-frame in UNI and NNI is depicted in FIG. 8. The standard Frame Relay header 152, payload 154, and FCS 156 are included in the fragment 150. FRF.12 adds a fragmentation header 158 containing the following fields:

(1) A beginning fragment bit (B) 160 which is set to 1 on the first data fragment of an original frame and set to 0 for all other fragments from that original frame.

(2) An ending fragment bit (E) 162 which is set to 1 on the last data fragment of an original frame and set to 0 for all other fragments from that original frame.

(3) A control bit (C) 164 which is reserved for future control functions.

(4) A sequence number 166 which is a 12-bit binary number that is incremented modulo $2^{12}$ for each successive fragment of an original frame. This sequence number keeps track of where in the original frame the individual fragments were taken from.

(4) A low order bit 168 which is always set to 1. This bit distinguishes a fragment header from a frame relay header.

The format for each sub-frame in End-to-End fragment is slightly different and is depicted in FIG. 9. The standard frame relay header 182, payload 184, and FCS 186 are included in the sub-frame 180. FRF.12 adds a fragmentation header 188 containing the same fields as the UNI/NNI format. However, the End-to-End fragment also includes an unnumbered information (UI) field 190 (also called a control field), which is used for compatibility purposes with older systems, and a network layer protocol identification (NLPID) field 192 added to the first fragment in a sequence, which stores information on the protocol used by the data within the fragment and allows for multiprotocol interconnection. NLPID fields are discussed in more depth below.

The format for a fragment using both FRF.11 and FRF.12 is depicted in FIG. 10. The same fields present in the End-to-End fragment (shown in FIG. 9) are present, including Frame Relay header 182, payload 184, FCS 186, fragmentation header 188, UI 190 and NLPID fields 192. An FRF.11 sub-frame header 194 is added which contains the exact same information as the sub-frame header in systems using only FRF.11. This format was depicted in FIG. 6.

It is now quite common to have a Frame Relay network connected to the Internet. Thus, many frames now carry data which has already been converted to the IP standard. This is known as IP over Frame Relay, ore more generically, multiprotocol interconnect over Frame Relay. Thus each frame can contain sub-frames containing data in the IP standard. In order to deal with these types of frames (as well as frames carrying data converted to standards other than IP), the Frame Relay Forum published a standard called RFC 1490. The main alteration of the sub-frame structure in RFC 1490 is the addition of a field called network layer protocol identification (NLPID). The NLPID field contains a two byte number representing the protocol being used by the data contained within the frame or the sub-frames. This allows the data to be properly converted back to its original form once it is received. The list of commonly used NLPID's is given in Table 2 below.

TABLE 2

| Hex Number | Protocol |
|---|---|
| 0x80 | SNAP |
| 0x81 | ISO CLNP |
| 0x82 | ISO ESIS |
| 0x83 | ISO ISIS |
| 0xCC | Internet IP |

Currently, all systems allowing for IP transmissions within a Frame Relay Network use the RFC 1490 standard or something similar. When using this multiprotocol interconnection in systems also using fragmentation (such as FRF.12), the system only stored the NLPID field in the first sub-frame of a sequence (since very sub-frame in the sequence will logically have the same NLPID value). The router then examines the first sub-frame in the sequence to determine its NLPID value. In systems without fragmentation, each sub-frame contains an NLPID value.

While this provides the compatibility required when transmitting IP (or other format) data over a Frame Relay network, the problem of transmitting voice or other delay-sensitive information still exists. If voice data is stored in IP packets (as is the case in Internet transmissions) and these IP packets are passed through a Frame Relay network, there is currently no mechanism in place to allow the Frame Relay network to distinguish between a delay-sensitive IP packet and non-delay sensitive IP packet. This type of transmission is known as voice over IP over Frame Relay and is depicted in FIG. 11. Voice sample 200 first travels over the Internet. Thus, it is placed in an IP packet 202. This IP packet 202 also contains an IP header 204, as depicted in FIG. 2. The IP packet 202, then travels through a Frame Relay network, and is thus placed in a Frame Relay sub-frame 206. The Frame Relay sub-frame 206 also contains a sub-frame header 208 as depicted in FIG. 6. Sub-frame 206 then is placed in a Frame Relay frame 210, which also contains a frame header 212 as depicted in FIG. 4. There are many other embodiments of voice over IP over Frame relay. The embodiment depends on the formats and standards used by the system. For example, a system using RFC 1490 may further split each IP packet into a sequence of sub-frames. However, all IP over Frame Relay embodiments suffer from the same problem, transmitting voice over IP over Frame Relay.

Accordingly, it would be desirable to provide a method for transmitting voice over IP over Frame Relay that would allow the network systems to easily recognize frames or fragments that were carrying delay-sensitive information and give priority to those delay-sensitive frames or fragments.

BRIEF DESCRIPTION OF THE INVENTION

A method of transmitting delay sensitive information over Internet Protocol (IP) over Frame Relay including storing the information in an IP packet, storing the IP packet in a sub-frame, storing a special symbol representing that the frame is delay sensitive in the sub-frame, storing the sub-frame in a frame, storing a network layer protocol identification representing that the frame contains IP information in the frame, and transmitting the frame over a Frame Relay Network, distinguishing delay sensitive information from non-delay sensitive information by examining the special symbol. Additionally, in systems using the FRF.12 or similar fragmenting standard, the special symbol may be stored in the header of the fragment.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

For purposes of this application, a Frame Relay network is any network utilizing a Frame Relay or similar standard of transmission. The network normally takes the form of electromagnetic signals carried through a signal transmission medium. The signal transmission medium can take many forms, including phone lines, fiberoptic cable, coaxial cable, and over-the-air transmission.

Figure 1:
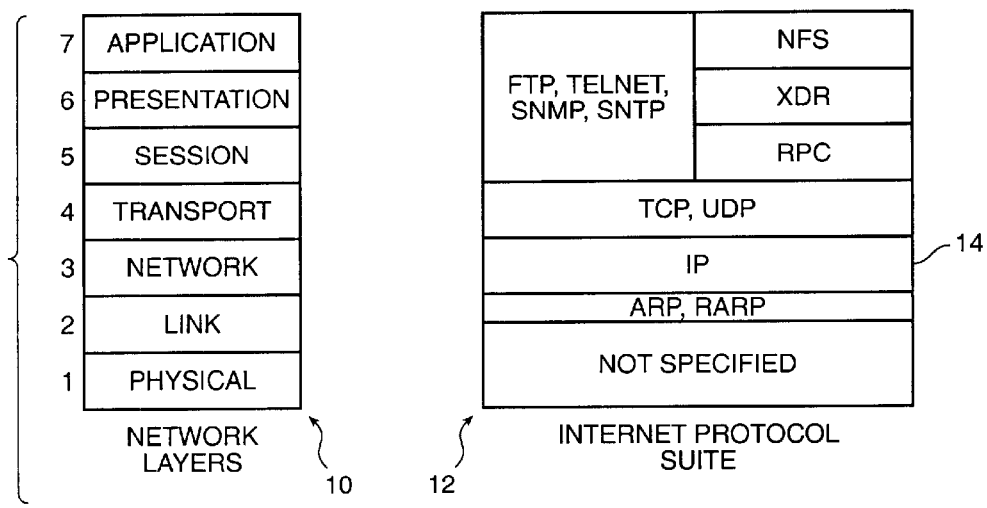
FIG. 1 is a diagram showing the ISO network standard and the Internet Protocol Suite standard.
Figure 2:
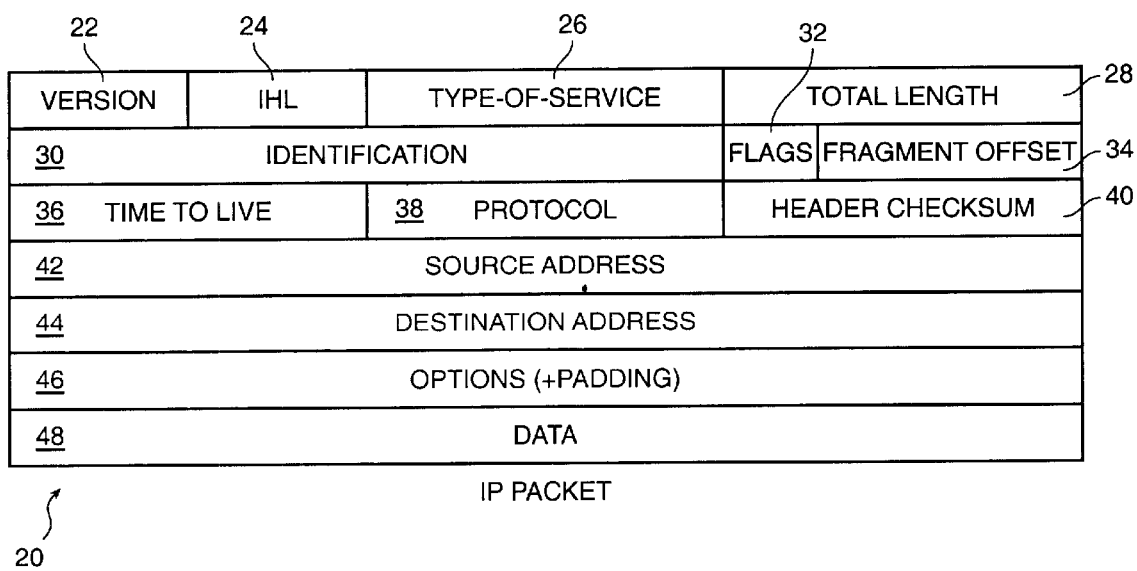
FIG. 2 is a diagram showing the format of an IP packet in accordance with the IP standard.
Figure 3:
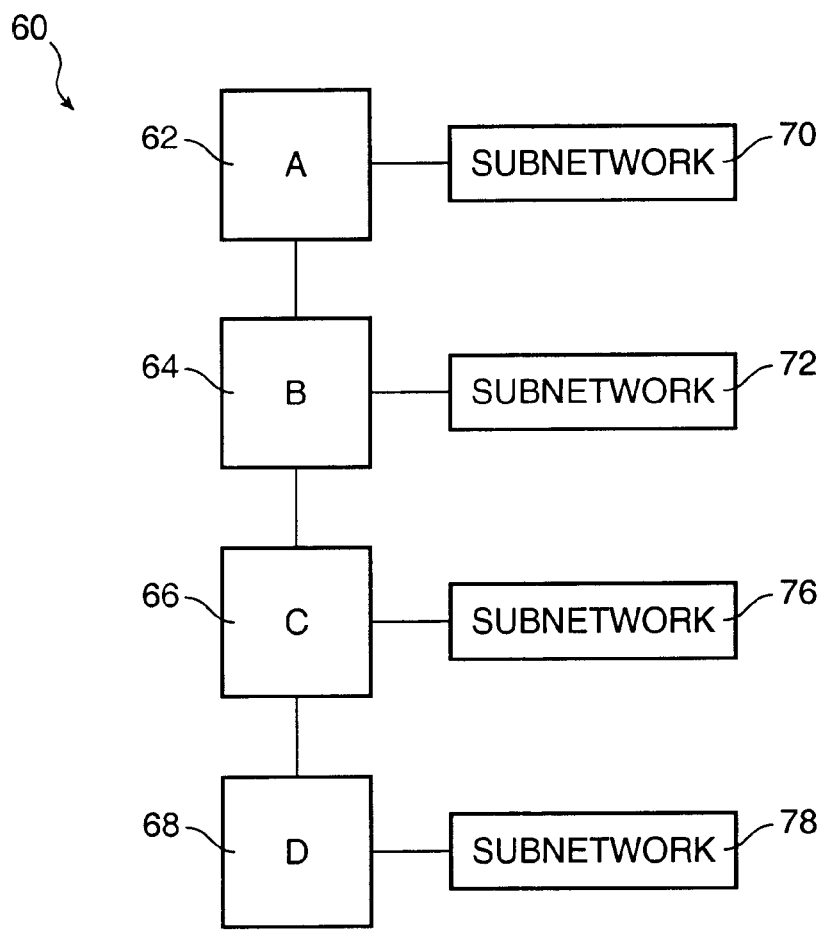
FIG. 3 is a block diagram showing an example of network having several sub-networks.
Figure 12:
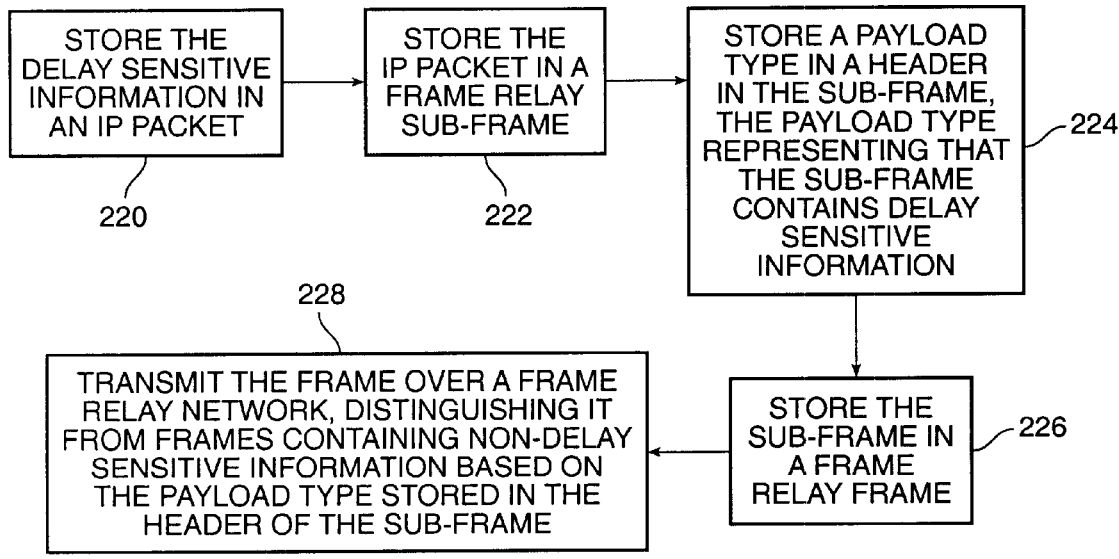
FIG. 12 is a flow diagram of a method for transmitting delay sensitive information over IP over Frame Relay in accordance with a first embodiment of the present invention.

A first embodiment of the present invention is depicted in FIG. 12. FIG. 12 depicts a flow diagram of a method used to transmit delay sensitive information over IP over Frame Relay. This embodiment is designed mainly for use in systems using the FRF.11 standard, although it is not limited to use in such systems. At step 220, the delay sensitive information is stored in an IP packet. IP packets are generally of the format depicted in FIG. 2 and the delay sensitive information would be placed in the data fields 48 of the IP packet 20. At step 222, the IP packet is placed in a Frame relay sub-frame. The Frame Relay sub-frame will generally be of the format depicted in FIG. 6 and the IP packet is placed in the payload field 122 of the sub-frame 110.

Figure 4:
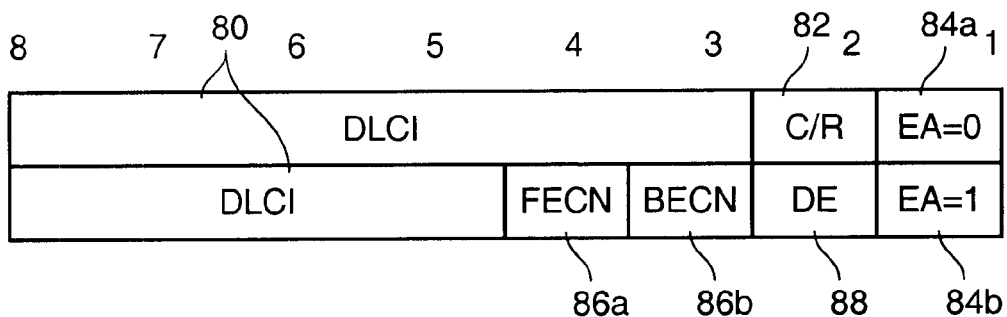
FIG. 4 is a diagram showing the format of a Frame Relay header in accordance with FRF standards.
Figure 5:
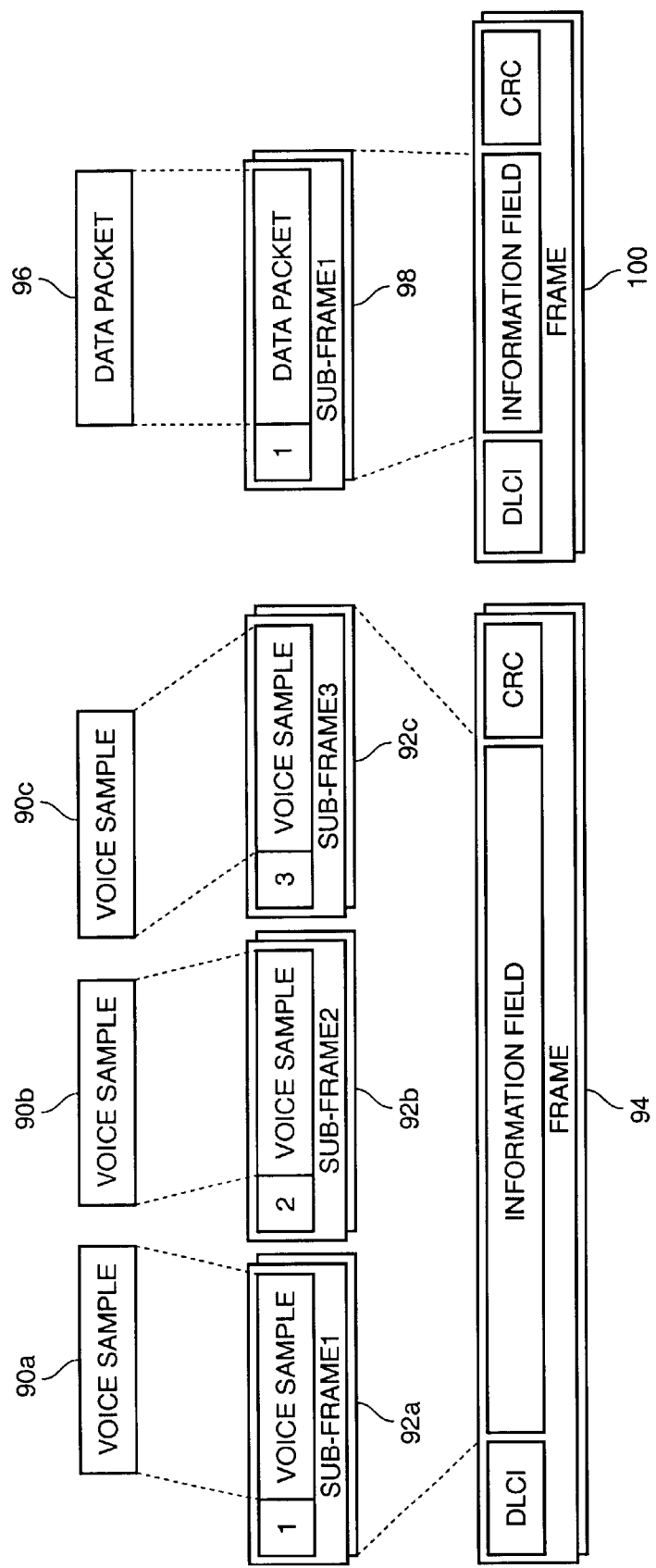
FIG. 5 is a block diagram of an example of using the FRF.11 standard to transmit voice over Frame Relay.

At step 224, a payload type is placed in the sub-frame. This payload type is generally placed in the payload type field 118 of the sub-frame 110 (this part of the sub-frame is sometimes called the sub-frame header). This payload type will represent the fact that sub-frame contains information which is delay-sensitive. Referring to Table 1 above, there is no pre-defined sequence of binary digits that represents that a payload is delay sensitive. Thus, a new sequence will have to be defined. For example, 0000, 0001, 0010, 0011, and 0100 are already assigned, therefore 0101 is a possible sequence that can be used. After this sequence is placed in the payload type field 118 of the sub-frame 110, the process moves to step 226. At step 226, the sub-frame is stored in a Frame Relay frame. The Frame Relay frame will generally have a header of format depicted in FIG. 4, and the sub-frame is placed following this header.

At step 228, the frame is transmitted over a Frame Relay network, distinguishing it from frames having IP packets which are non-delay sensitive based on the payload type stored in the sub-frame. For example, a router within the Frame Relay system may first examine the payload types of all the sub-frames of the frame. If a sub-frame with the payload type 0101 is detected, the frame containing that sub-frame will be given special priority over other frames. In more cases, it would be preferable for the router to give priority to a frame having many sub-frames containing non-delay sensitive information as long as at least one of the sub-frames within the frame contains delay-sensitive information. However, it is also possible to have many tiers of priority, with a frame having two delay sensitive sub-frames having a higher priority than a frame having one delay sensitive sub-frame, even though both frames would have priority over a frame with no delay sensitive sub-frames.

How the router handles the priority given to the frame is dependent on the how the designer wishes to handle delay-sensitive information. It is possible that the frame will be given super-priority over all other frames, such that whenever a frame such as this is detected, it is automatically placed in transit through the network, forcing all other frames to wait if there is congestion in the network. Of course, using this type of priority leads to the possibility of starvation of the low-priority frames. It is also possible that the designer may wish to give non-IP information priority over IP information, even the IP information is delay sensitive, so the delay sensitive IP information may only have priority over non-delay sensitive IP information, but not over non-delay sensitive ISO ISIS information. It is likely that the designer will implement a routing scheme that balances the need for delay-sensitive frames to be sent very quickly against the need of the other frames to have access to the network as well.

Figure 6:
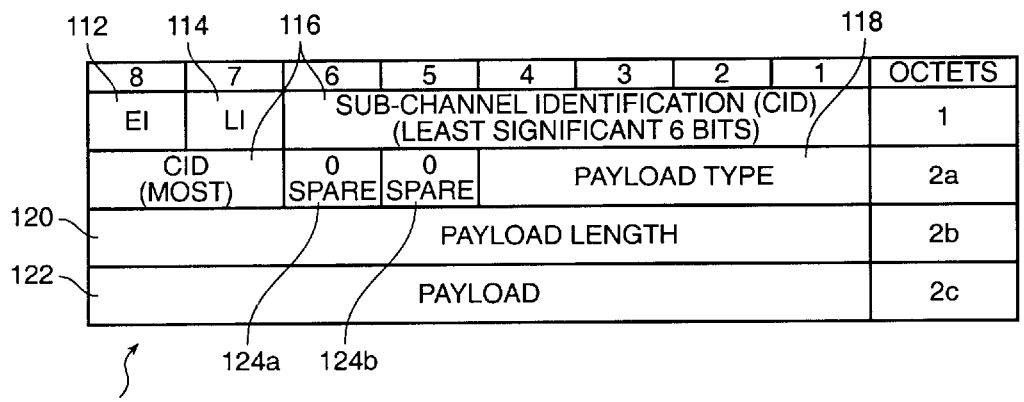
FIG. 6 is a diagram showing the format of a Frame Relay sub-frame in accordance with the FRF.11 standard.
Figure 10:
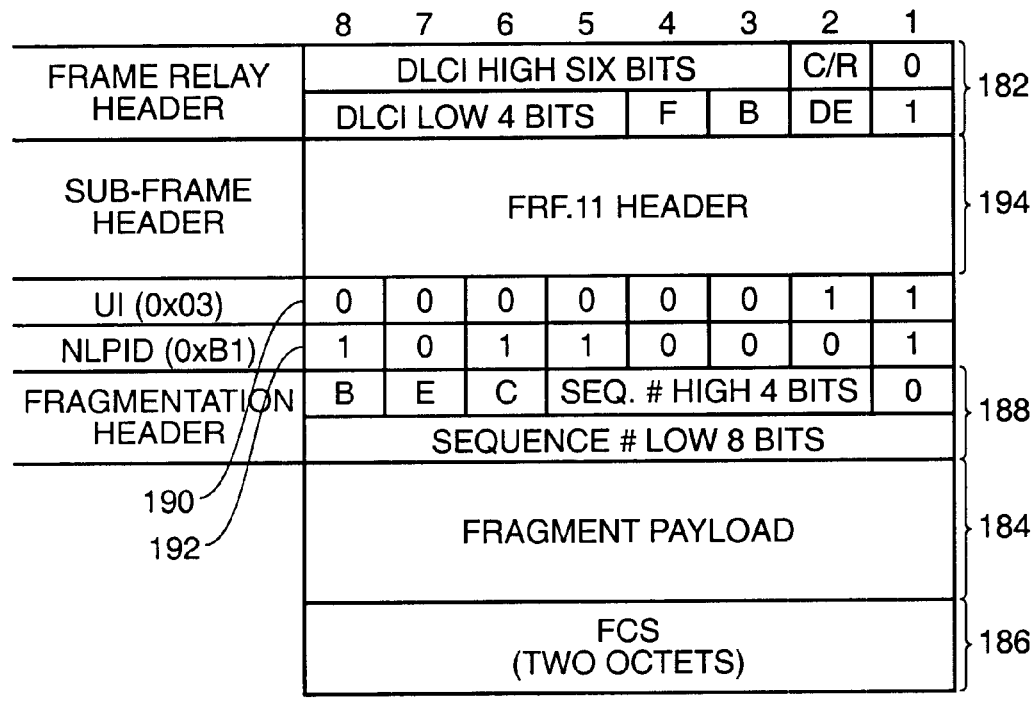
FIG. 10 is a diagram showing the format of a fragment in the RFC 1490 version of the FRF.12 standard.
Figure 11:
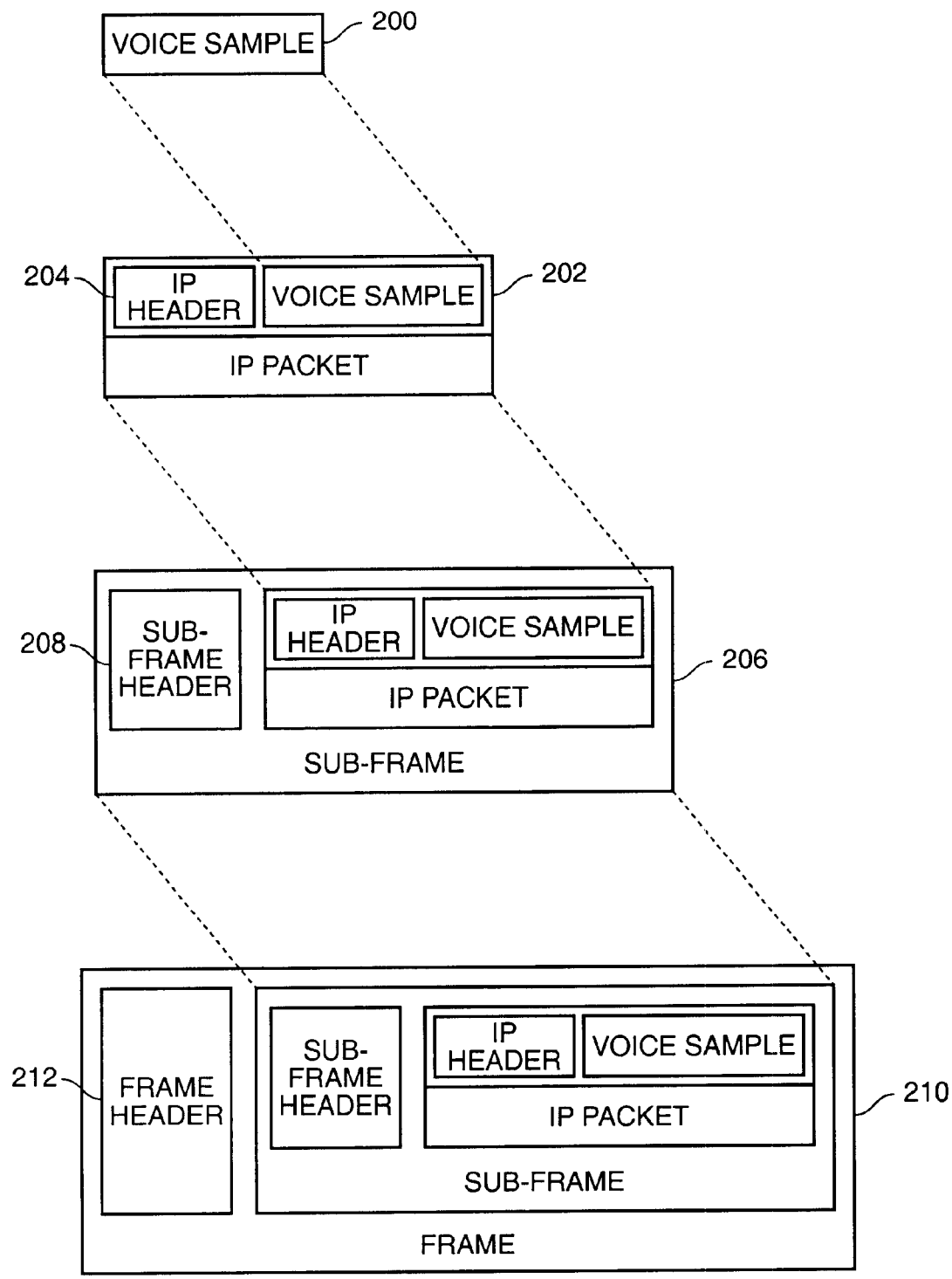
FIG. 11 is a diagram showing an example of how a voice sample is placed in an IP packet, which is placed in a sub-frame, which is placed in a frame for transmit over a Frame Relay network.
Figure 13:
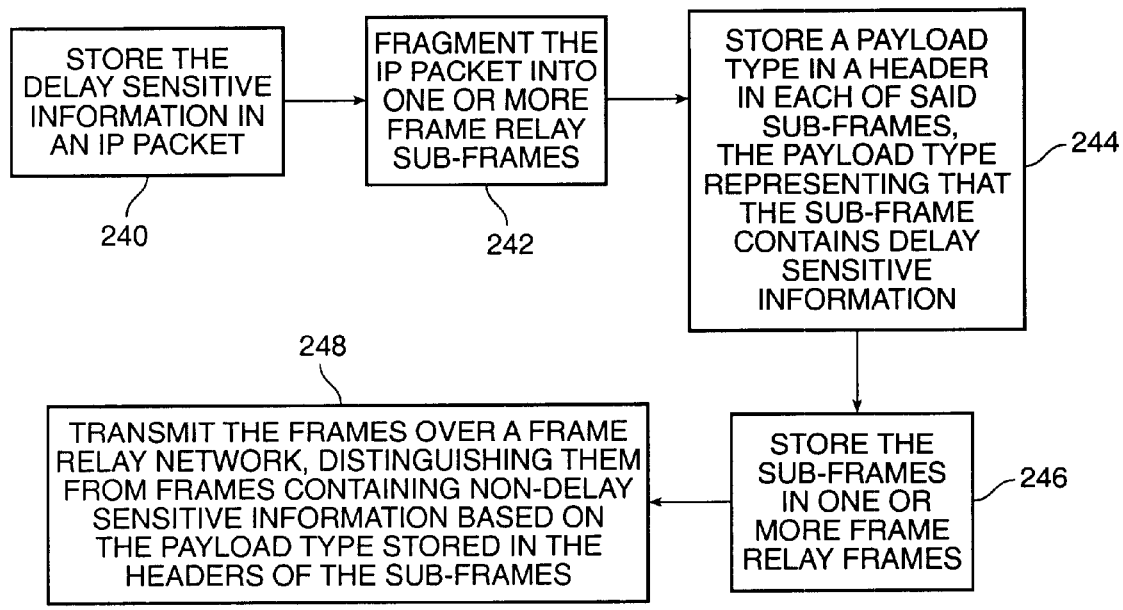
FIG. 13 is a flow diagram of a method for transmitting delay sensitive information over IP over Frame Relay in accordance with a second embodiment of the present invention.

A second embodiment of the present invention is depicted in FIG. 13. This embodiment is similar to the first embodiment, except that it is designed for use with systems that uses FRF.12 or a similar standard that uses fragmentation. At step 240, the delay sensitive information is placed in an IP packet. At step 242, the IP packet is fragmented according to the fragmenting standard into one or more Frame Relay sub-frames. The sub-frames will likely be of the format depicted in FIG. 10 and incorporate the FRF.11 sub-headers 194 (which are depicted in greater detail in FIG. 6) into the header of the sub-frame. At step 244, a payload type is placed in these header in the sub-frames. Referring to FIG. 6, this payload type is placed in the payload type field 118 of each sub-frame 110. This payload type represents the fact that each sub-frame contains delay-sensitive information. At step 246 the sub-frames are stored in one or more Frame Relay frames. Since we have fragmented a single IP packet, it is preferable to place only one of the sub-frames in each frame, or else the effect of fragmenting will be diminished. However, it is very possible that additional sub-frames from other sources will be placed in each frame as well.

At step 248, the frames are transmitted over a Frame Relay network, distinguishing them from frames containing non-delay sensitive information based on the payload type stored in the headers in each of the sub-frames. For example, a router within the Frame Relay system may first examine the payload types of the sub-frames. If a sub-frame with the payload type 0101 is detected, any frame containing that sub-frame will be given special priority over other frames. Again, how the router handles this priority is dependent on the how the designer wishes to handle delay-sensitive information.

Figure 14:
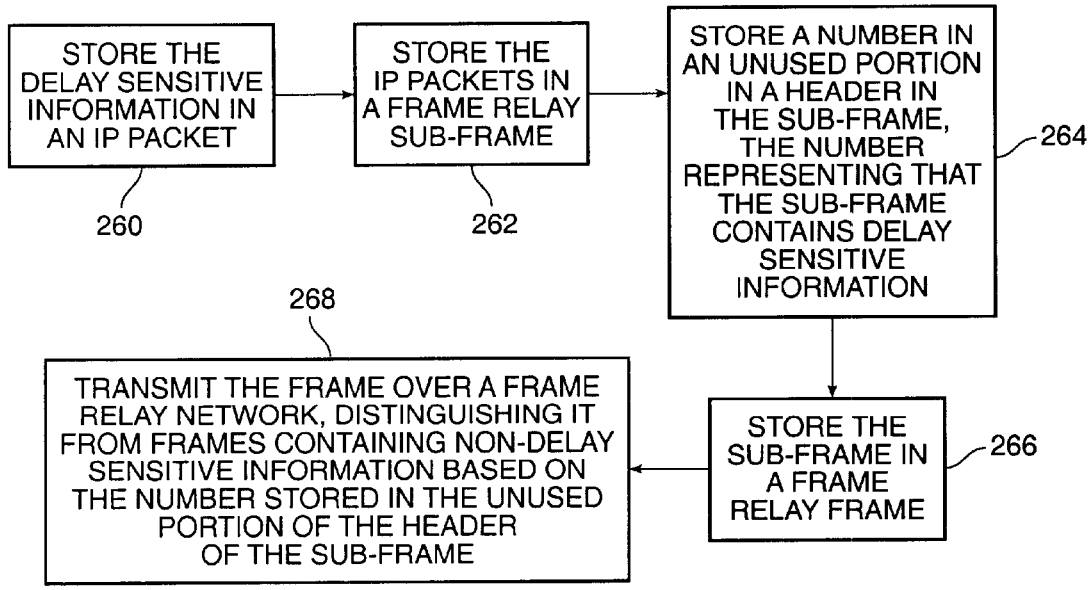
FIG. 14 is a flow diagram of a method for transmitting delay sensitive information over IP over Frame Relay in accordance with a third embodiment of the present invention.

A third embodiment of the present invention is depicted in FIG. 14. At step 260, the delay sensitive information is stored in an IP jacket. At step 262, the IP packet is placed in a Frame Relay sub-frame. At step 264, a number is stored in an unused portion of the FRF.11 header of the sub-frame, the number representing that the sub-frame contains delay sensitive information. For purposes of this specification, the term unused portion refers to any portion of the FRF.11 header of the sub-frames that is not specifically set aside for other purposes. Referring to FIG. 6, this number will most likely be placed in the spare or reserved fields 124a, 124b of subframe 110 in the FRF.11 standard. It may be as simple as placing a 1 in one of those fields rather than a 0. Then, at step 266, the sub-frame is stored in a Frame Relay frame.

At step 268, the frame is transmitted over a Frame Relay network, distinguishing it from frames containing non-delay sensitive information based on the number stored in the unused portion of the FRF.11 header of the sub-frame. For example, a router within the Frame Relay system may first examine the unused portion of all the sub-frames of the frame. If a sub-frame with the number 1 in the unused or reserved field are detected, the frame will be given special priority over other frames. Again, how the router handles this priority is dependent on the how the designer wishes to handle delay-sensitive information.

Figure 15:
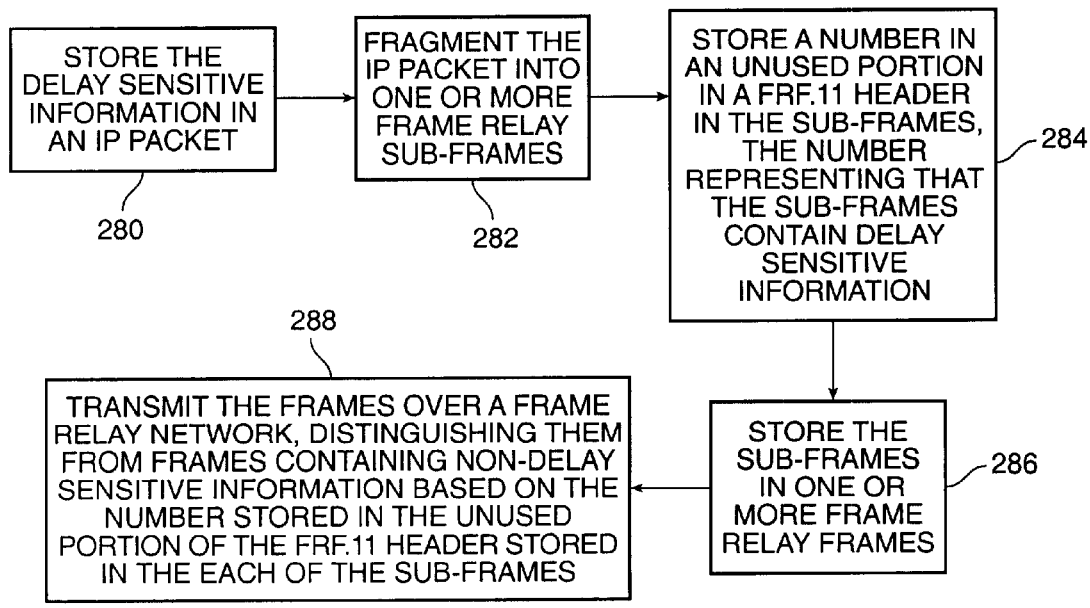
FIG. 15 is a flow diagram of a method for transmitting delay sensitive information over IP over Frame Relay in accordance with a fourth embodiment of the present invention.

A fourth embodiment of the present invention is depicted in FIG. 15. This embodiment is similar to the third embodiment, except that it is designed for use with systems that use FRF.12 or a similar standard that uses fragmentation. At step 280, the delay sensitive information is placed in an IP packet. At step 282, the IP packet is fragmented into one or more Frame Relay sub-frames in accordance with the fragmenting standard. At step 284, a number is stored in the unused portion of the FRF.11 headers in the sub-frames. Again, referring to FIG. 6, this number is normally placed in the spare or reserved fields 124a, 124b of subframes 110 in the FRF.11 standard. This number represents the fact that the sub-frame contains delay-sensitive information. At step 286, the sub-frames are stored in one or more Frame Relay frames. Again, it is preferable to only store one of these sub-frames in each frame.

At step 288, the frames are transmitted over a Frame Relay network, distinguishing them from frames containing non-delay sensitive information based on the number stored in the unused portions of the FRF.11 headers stored in each of the frames. For example, a router with the Frame Relay system may first examine the unused portions of the FRF.11 headers within the sub-frames. If a 1 is detected, the frame is given special priority over other frames. Again, how the router handles this priority is dependent on the how the designer wishes to handle delay-sensitive information.

Figure 16:
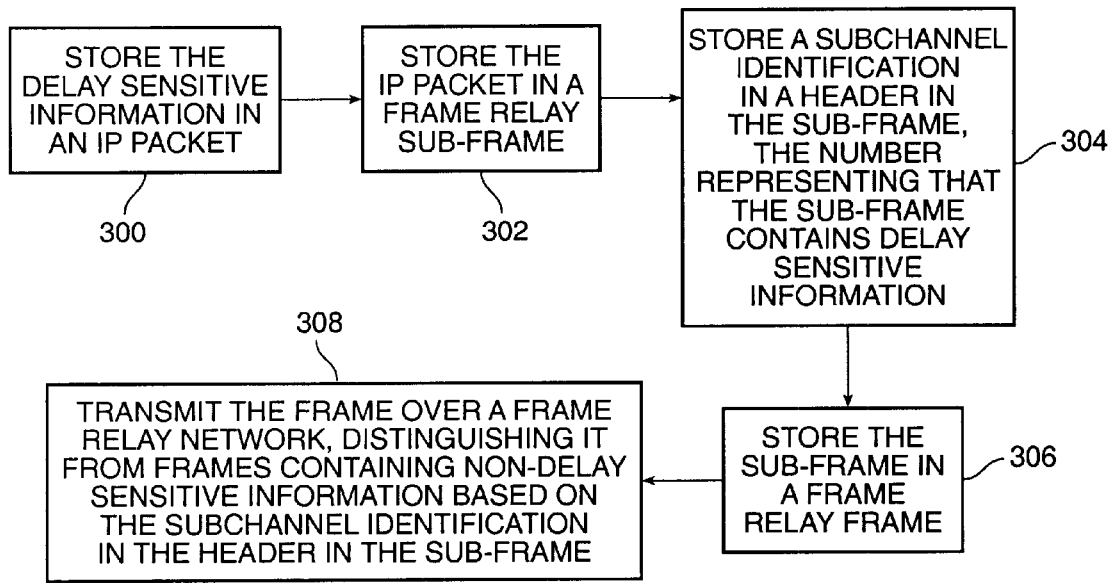
FIG. 16 is a flow diagram of a method for transmitting delay sensitive information over IP over Frame Relay in accordance with a fifth embodiment of the present invention.

A fifth embodiment of the present invention is depicted in FIG. 16. At step 300, the delay sensitive information is stored in an IP packet. At step 302, the IP packet is placed in a Frame relay sub-frame. At step 304, a subchannel identification is stored in the header of the sub-frame, the subchannel identification representing that the sub-frame contains delay sensitive information. Then, at step 306, the sub-frame is stored in a Frame Relay frame.

At step 308, the frame is transmitted over a Frame Relay network, distinguishing it from frames containing non-delay sensitive information based on the subchannel identification in the header of the sub-frame. For example, a router within the Frame Relay system may first examine the unused portion of all the sub-frames of the frames. If sub-frames with the number 1 in the unused or reserved field are detected, the frame will be given special priority over other frames. Again, how the router handles this priority is dependent on the how the designer wishes to handle delay-sensitive information.

Figure 17:
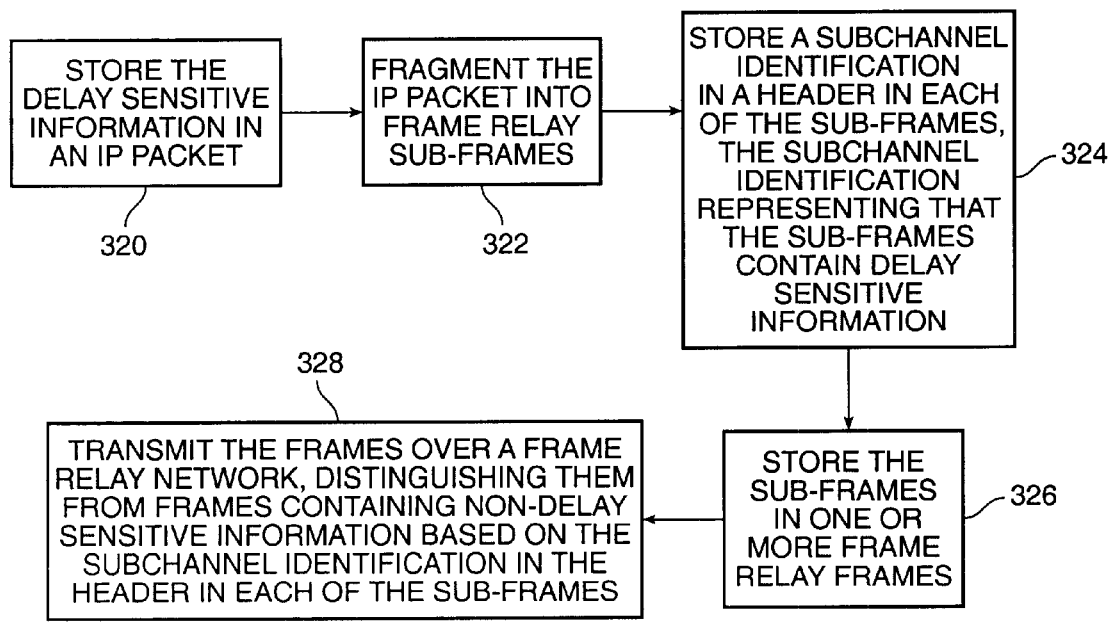
FIG. 17 is a flow diagram of a method for transmitting delay sensitive information over IP over Frame Relay in accordance with a sixth embodiment of the present invention.

A sixth embodiment of the present invention is depicted in FIG. 17. This embodiment is similar to the fifth embodiment, except that it is designed for use with systems that use FRF.12 or a similar standard that uses fragmentation. At step 320, the delay sensitive information is placed in an IP packet. At step 322, the IP packet is fragmented into one or more Frame Relay sub-frames. At step 324, a subchannel identification is stored in a header in each sub-frame. The subchannel identification represents the fact that the sub-frames contain delay-sensitive information. At step 326, the sub-frames are stored in one or more Frame Relay frames. Again, it is preferable to store only one sub-frame in each frame.

At step 328, the frames are transmitted over a Frame Relay network, distinguishing them from frames containing non-delay sensitive information based on the subchannel identification stored in the header in each of the frames. For example, a router within the Frame Relay system may first examine the subchannel identification in the headers in the sub-frames. If a delay-sensitive frame is detected, it is given special priority over non-delay sensitive fragments. Again, how the router handles this priority is dependent on the how the designer wishes to handle delay-sensitive information.

Figure 18:
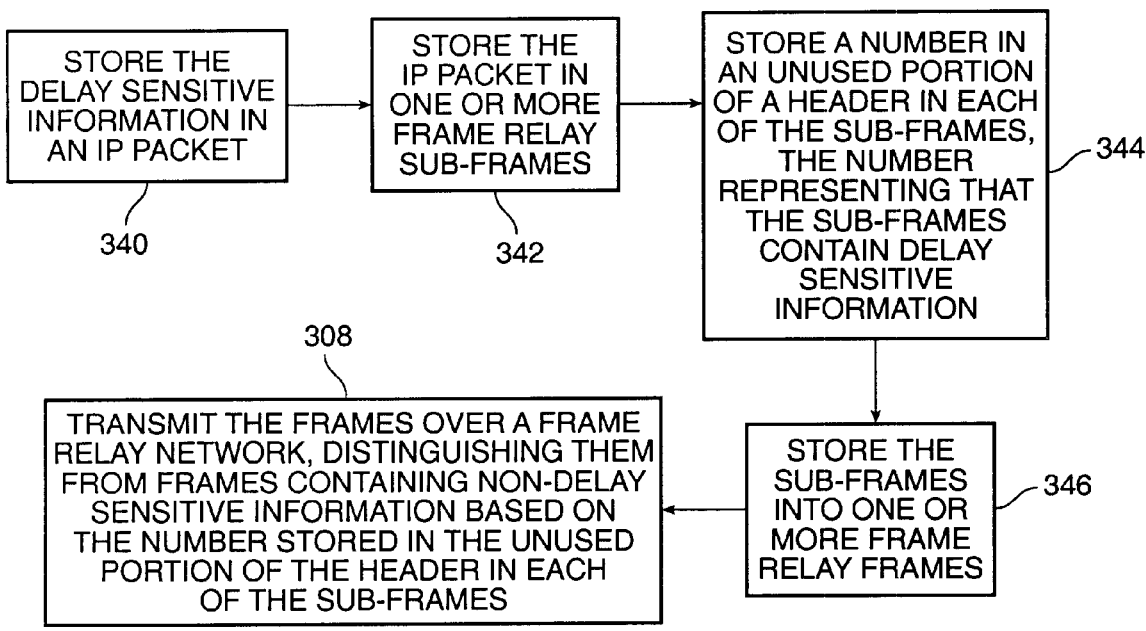
FIG. 18 is a flow diagram of a method for transmitting delay sensitive information over IP over Frame Relay in accordance with a seventh embodiment of the present invention.

A seventh embodiment of the present invention is depicted in FIG. 18. This embodiment is designed mainly for use with systems that use FRF.12 or a similar standard that uses fragmentation. At step 340, the delay sensitive information is placed in an IP packet. At step 342, the IP packet is fragmented into one or more Frame Relay sub-frames.

Figure 7:
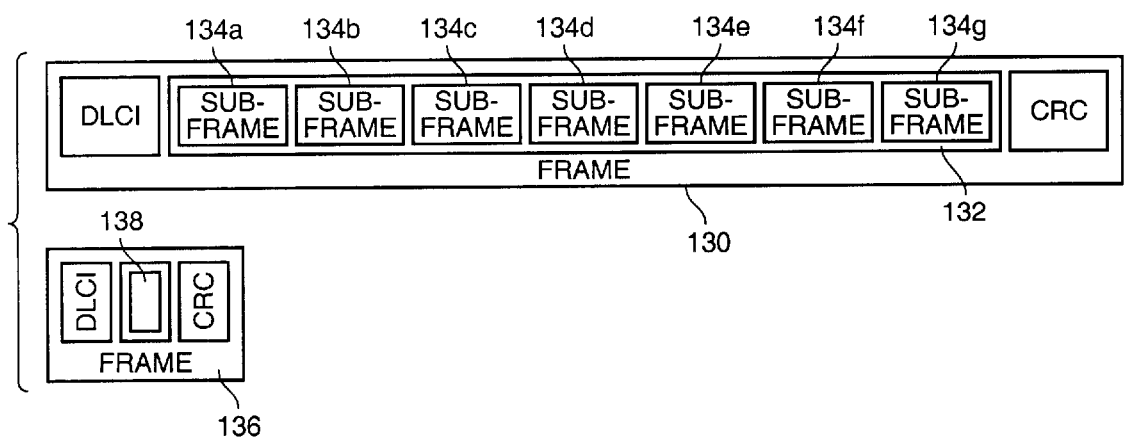
FIG. 7 is a block diagram showing an example of where excessive delay or starvation can occur for a data packet when a large amount of voice information is given priority.
Figure 8:
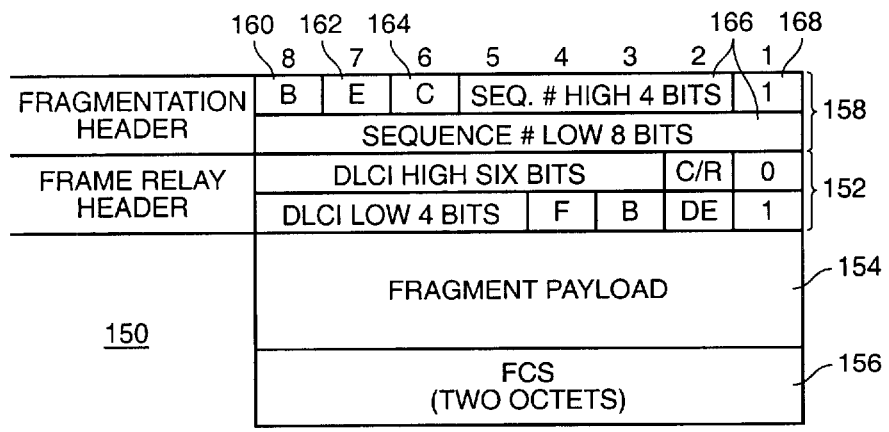
FIG. 8 is a diagram showing the format of a fragment in UNI and NNI versions of the FRF.12 standard.
Figure 9:
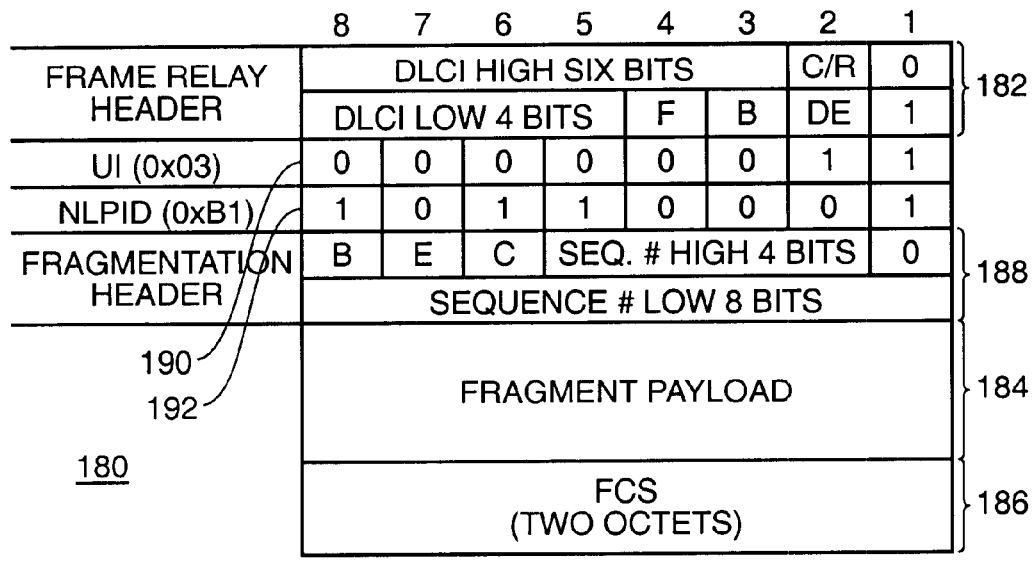
FIG. 9 is a diagram showing the format of a fragment in the end-to-end version of the FRF.12 standard.

At step 344, a number is placed in an unused portion of a header in each of the sub-frames, the number representing that the sub-frames contains delay sensitive information. This portion will be contained in a portion of the headers not set aside for the FRF.11 header as that embodiment is covered by the fourth embodiment. Referring to FIG. 7, the unused portion will most likely be the control bit field 164 of the sub-frame headers 158 (188 in FIG. 8). This may be as simple as placing 1 in each control bit fields to represent that the subframes contains delay sensitive information. At step 346, the sub-frames are stored in one or more Frame Relay frames.

At step 348, the frames are transmitted over a Frame Relay network, distinguishing them from frames containing non-delay sensitive information based on the number stored in the unused portions of the headers in each of the sub-frames. For example, a router within the Frame Relay system may first examine the control bit field of the header within each sub-frame. If a 1 is detected, the frame is given special priority over other frames. Again, how the router handles this priority is dependent on the how the designer wishes to handle delay-sensitive information.

Figure 19:
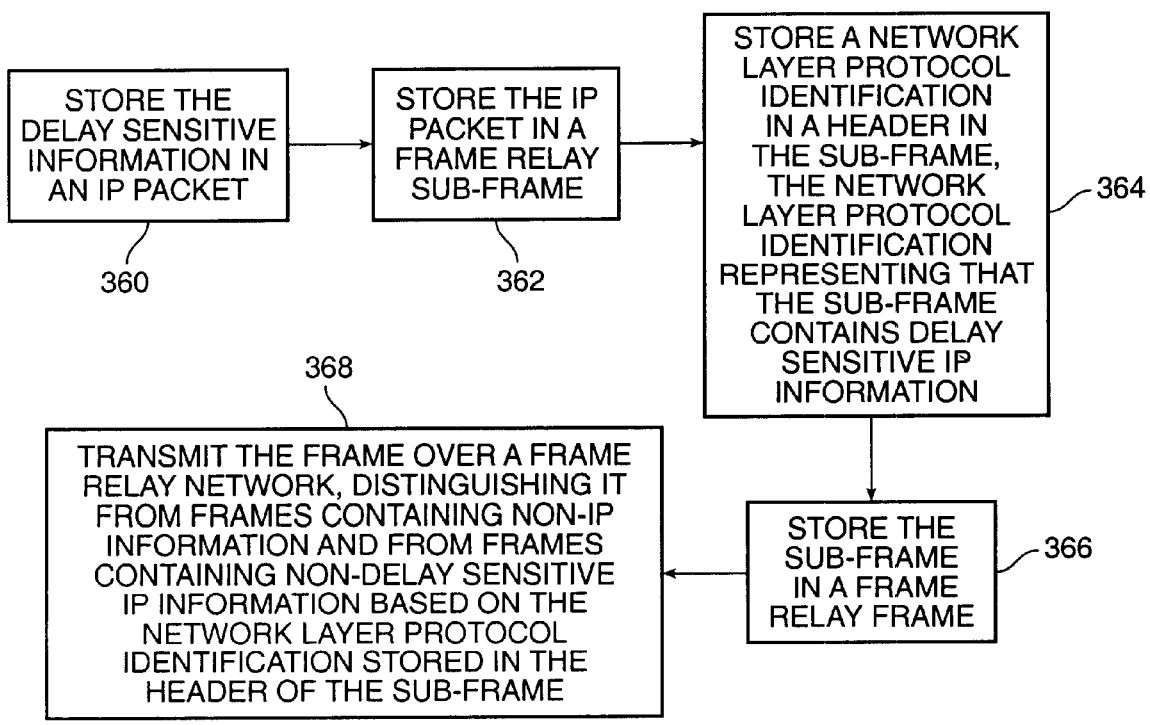
FIG. 19 is a flow diagram of a method for transmitting delay sensitive information over IP over Frame Relay in accordance with an eighth embodiment of the present invention.

An eighth embodiment of the present invention is depicted in FIG. 19. This embodiment is designed for use with any standard that uses has an NLPID field, which will normally be all systems using the RFC 1490 standard. At step 360, the delay sensitive information is placed in an IP packet. At step 362, the IP packet is placed in a Frame Relay sub-frame. At step 364, a network layer protocol identification is stored in the frame. The network layer protocol identification represents that the frame contains delay sensitive IP information. Referring to Table 2 above, several of the numbers are already reserved. However, we may assign hexadecimal number 0xCD to represent delay-sensitive IP. At step 366, the sub-frame is stored in a Frame Relay frame. The Frame Relay frame will generally have a header of format depicted in FIG. 4, and the sub-frame is placed following this header.

At step 368, the frame is transmitted over a Frame Relay network, distinguishing it from frames containing non-delay sensitive IP information based on the network layer protocol identification stored in the frame. For example, a router within the Frame Relay system may examine the network layer protocol identification of each frame coming in. If a frame with the right network protocol identification is detected, the frame is given priority over frames which contain non-delay sensitive IP information. Again, how the router handles this priority is dependent on the how the designer wishes to handle delay-sensitive information.

These embodiments all have the advantage of notifying the router that a certain signal, such as a frame, is delay sensitive. This will allow routers to properly handle delay sensitive information transmitted over IP over Frame Relay and will aid in the transmission of real-time voice information, as well as other delay sensitive information such as video and interactive video games.

Another group of embodiments describ the method by which Frame Relay frames can be handled in accordance with the present invention. These methods will probably be performed by a router in the network, the methods aiding in the selection of which frames or fragments to give priority.

Figure 20:
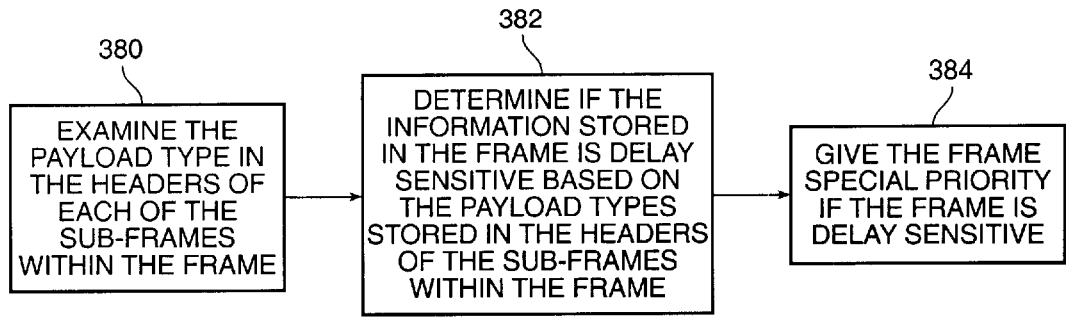
FIG. 20 is a flow diagram of a method for handling a Frame Relay frame in accordance with a ninth embodiment of the present invention.
Figure 21:
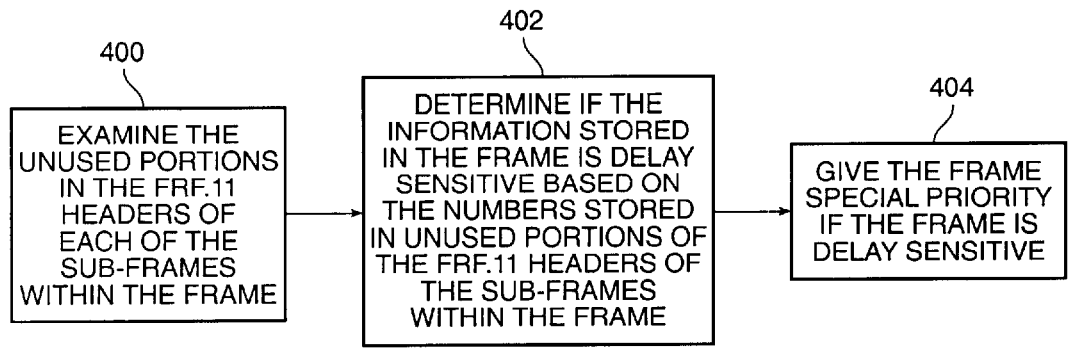
FIG. 21 is a flow diagram of a method for handling a group of Frame Relay fragments in accordance with a tenth embodiment of the present invention.

A ninth embodiment of the present invention is depicted in FIG. 20. This embodiment is drawn to a method for handling a Frame Relay frame in a system has stored delay sensitive information in a process similar to that of the first or second embodiments. At step 380, the payload type in each of the headers of the sub-frames within the frame are examined. At step 382, the payload types are used to determine if the information stored in the frame is delay sensitive or not. At step 384, the frame is given special priority if the frame is delay sensitive. Again, there is some flexibility as to what type of priority is given. It is possible that only one of the sub-frames within the frame contains delay sensitive information. In this case, the frame will likely be given higher priority than a frame not containing any delay sensitive information, but may be given lower priority than a frame containing more sub-frames having delay sensitive information.

A tenth embodiment of the present invention is depicted in FIG. 20. This embodiment is drawn to a method for handling a Frame Relay frame in a system which has stored delay sensitive information in a process similar to that of the third or fourth embodiments. At step 400, the unused portions in each of the FRF.11 headers of the sub-frames within the frame are examined. At step 402, the numbers in the unused portions are used to determine if the information stored in the frame is delay sensitive or not. At step 404, the frame is given special priority if the frame is delay sensitive. Again, there is some flexibility as to what type of priority is given.

Figure 22:
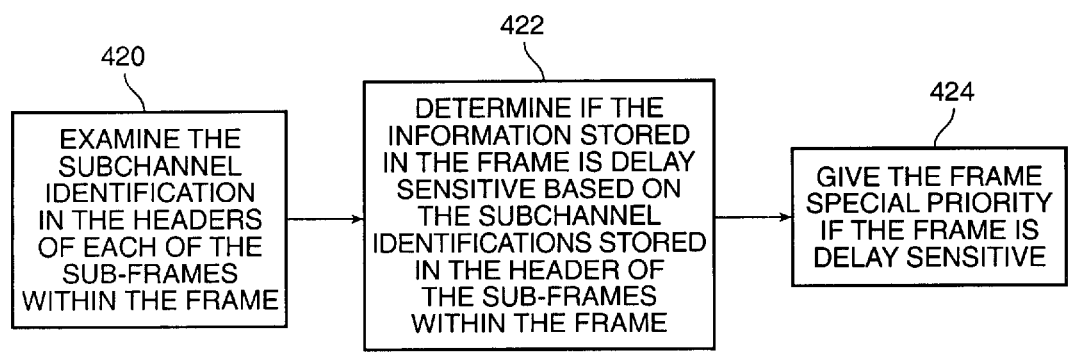
FIG. 22 is a flow diagram of a method for handling a Frame Relay frame in accordance with an eleventh embodiment of the present invention.

An eleventh embodiment of the present invention is depicted in FIG. 22. This embodiment is drawn to a method for handling a Frame Relay frame in a system which has stored delay sensitive information in a process similar to that of the fifth or sixth embodiments. At step 420, the subchannel identifications in each of the sub-frames within the frame are examined. At step 422, the subchannel identifications are used to determine if the information stored in the frame is delay sensitive or not. At step 424, the frame is given special priority if the frame is delay sensitive. Again, there is some flexibility as to what type of priority is given.

Figure 23:
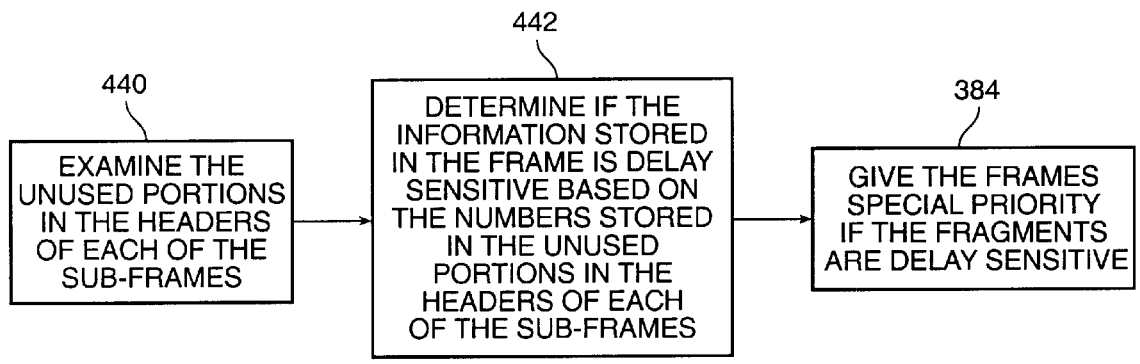
FIG. 23 is a flow diagram of a method for handling a group of Frame Relay fragments in accordance with a twelfth embodiment of the present invention.

A twelfth embodiment of the present invention is depicted in FIG. 23. This embodiment is drawn to a method for handling a Frame Relay frame in a system which has stored delay sensitive information in a process similar to that of the seventh embodiment. At step 440, the unused portion in the headers in each of the fragments are examined. At step 442, the numbers in the unused portions of the fragment headers are used to determine if the information stored in the fragments is delay sensitive or not. At step 444, the fragments are given special priority if the fragments are delay sensitive. Again, there is some flexibility as to what type of priority is given.

Figure 24:
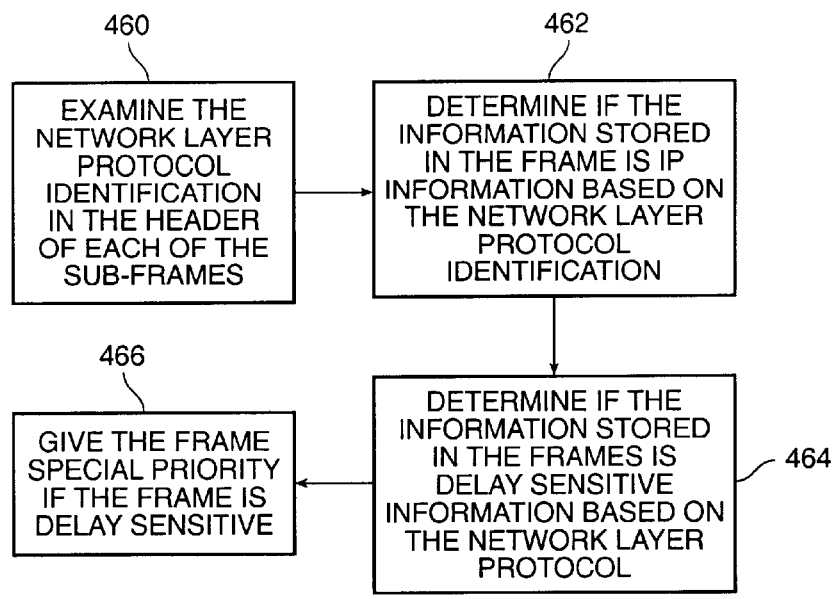
FIG. 24 is a flow diagram of a method for handling a Frame Relay frame in accordance with a thirteenth embodiment of the present invention.

A thirteenth embodiment of the present invention is depicted in FIG. 24. This embodiment is drawn to a method for handling a Frame Relay frame in a system which has stored delay sensitive information in a process similar to that of the eighth embodiment. At step 460, the network layer protocol identification of the frame is examined. At step 462, the network layer protocol identification may be used to determine if the information in the frame is IP information. At step 464, the network layer protocol identification may be also used to determine if the information stored in the frame is delay sensitive or not. At step 466, the frame is given special priority if the frame is delay sensitive. Again, there is some flexibility as to what type of priority is given.

Figure 25:
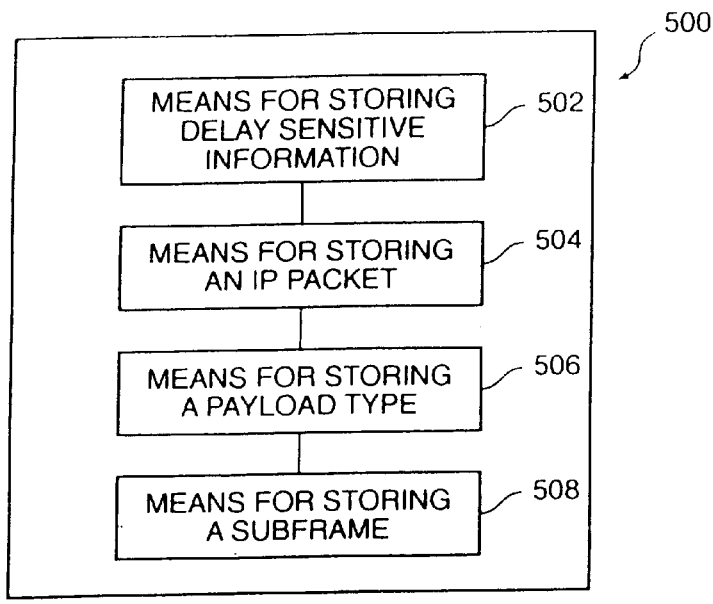
FIG. 25 is a block diagram of an apparatus to transmit delay sensitive information over IP over Frame Relay in accordance with an embodiment of the present invention.

FIG. 25 shows a block diagram of an apparatus 500 to transmit delay sensitive information over IP over Frame Relay. The apparatus 500 has a means for storing the delay sensitive information 502 in an IP packet coupled to a means for storing the IP packet 504 in a Frame Relay sub-frame coupled to a means for storing a payload type 506 in a header of the sub-frame coupled to a means for storing the sub-frame 508.

Figure 26A:
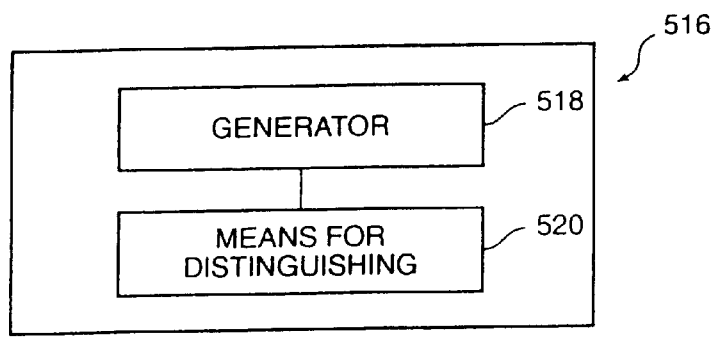
FIGS. 26A and 26B are block diagrams of an apparatus to transmit delay sensitive information over IP over Frame Relay in accordance with another embodiment of the present invention.
Figure 26B:
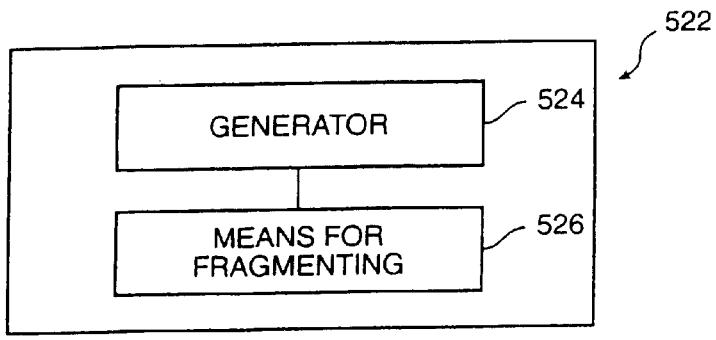

FIG. 26A is a block diagram of another embodiment of an apparatus 516 to transmit delay sensitive information over IP over Frame Relay. The apparatus 516 has a generator 518 to generate either a Frame Relay frame or an IP packet coupled to a means for distinguishing 520 the Frame Relay frame from other Frame Relay frames containing non-delay sensitive information if the payload type of any of the sub-frames within the Frame Relay frame indicates that the sub-frame is delay sensitive. FIG. 26B shows yet another embodiment of the present invention where the apparatus 522 also has a generator 524 to generate with Frame Relay frames or IP packets coupled to a means for fragmenting the IP packet into Frame Relay sub-frames.

Figure 27:
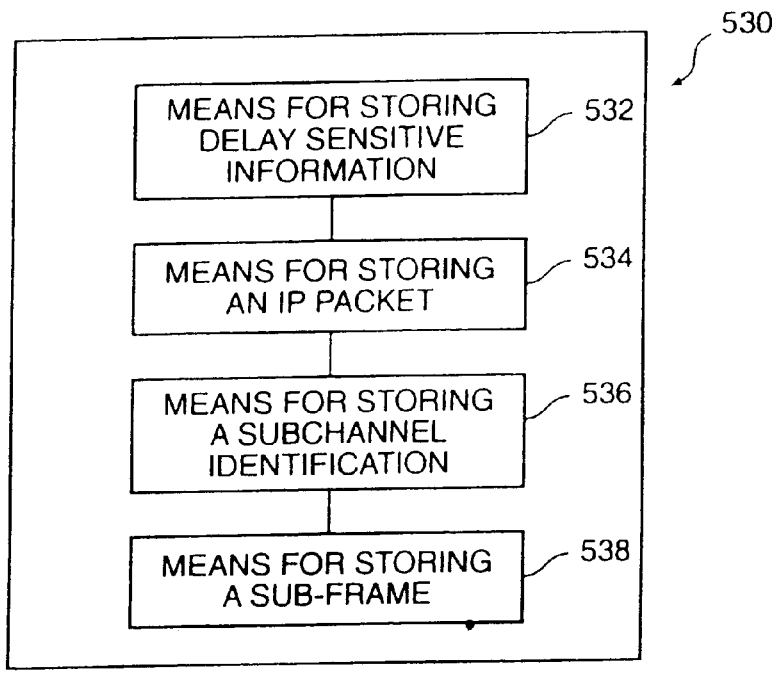
FIG. 27 is a block diagram of an apparatus to transmit delay sensitive information over IP over Frame Relay in accordance with yet another embodiment of the present invention.

FIG. 27 is a block diagram of an apparatus 530 to transmit delay sensitive information over IP over Frame Relay. The apparatus 530 has a means for storing the delay sensitive information 532 in an IP packet coupled to a means for storing the IP packet 534 in a Frame Relay sub-frame coupled to a means for storing a sub-channel identification 536 in the header of the sub-frame coupled to a means for storing the sub-frame 538 in the Frame Relay frame.

Figure 28:
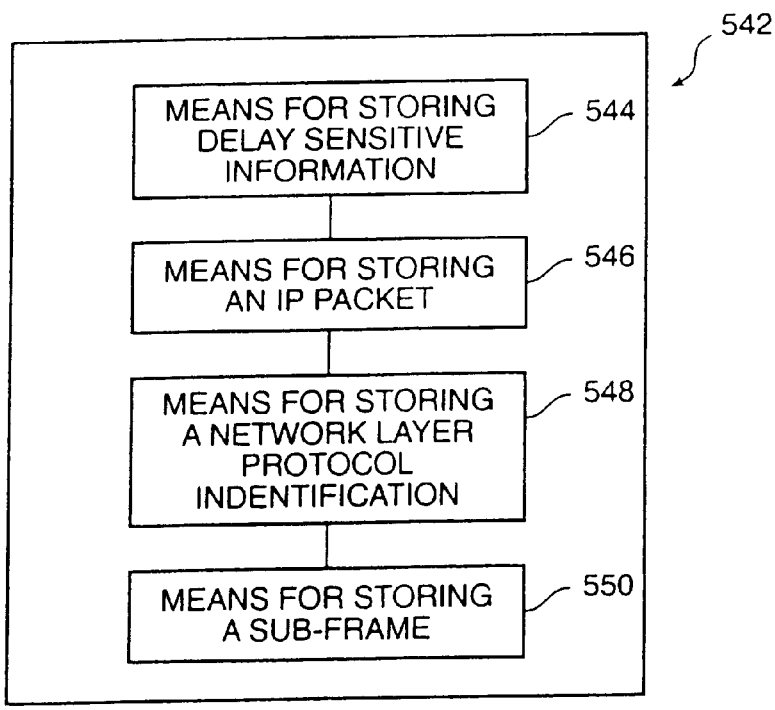
FIG. 28 is a block diagram of an apparatus to transmit delay sensitive information over IP over Frame Relay in accordance with another embodiment of the present invention.

FIG. 28 is yet another embodiment of an apparatus 542 to transmit delay sensitive information over IP over Frame Relay. The apparatus 542 has a means for storing delay sensitive information 544 in an IP packet coupled to a means for storing the IP packet 546 in a Frame Relay sub-frame coupled to a means for storing a network layer protocol identification 548 in the frame coupled to a means for storing the sub-frame 550 in a Frame Relay frame.

Figure 29:
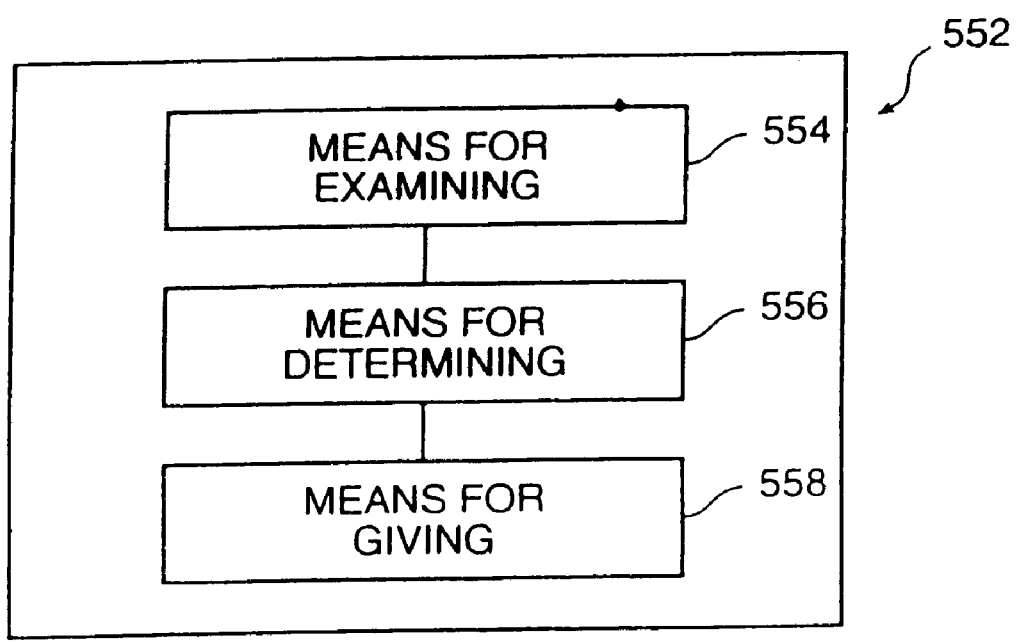
FIG. 29 is a block diagram of an apparatus to process a Frame Relay in accordance with an embodiment of the present invention.

FIG. 29 is another embodiment of the present invention, an apparatus 522 to process the Frame Relay frame. The apparatus 552 has a means for examining 554, a means for determining 556 if the information stored in the frame is delay sensitive, and a means for giving 558 the frame special priority if the frame is delay sensitive. The means for examining 554 may be used to examine payload types in the headers of the sub-frames, the unused portion in the headers of the sub-frames, the subchannel identification in the header of the sub-frames, or the network layer protocol identification.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for transmitting delay sensitive information over IP over Frame Relay, comprising:

means for storing the delay sensitive information in an IP packet;

means for storing said IP packet in a Frame Relay sub-frame;

means for storing a payload type in a header in said sub-frame, said payload type representing that said sub-frame contains at least one IP packet that includes delay sensitive information;

means for storing said sub-frame in a Frame Relay frame; and means for transmitting said frame over a Frame Relay network, distinguishing it from frames containing non-delay sensitive information based on said payload type stored in said header of said sub-frame.

2. An apparatus in accordance with claim 1, wherein said means for transmitting includes:

means for distinguishing said frame from frames containing non-delay sensitive information if the payload type of any of the sub-frames within said frame indicates that the sub-frame is delay sensitive.

3. An apparatus for transmitting delay sensitive information over IP over Frame Relay, comprising:

means for storing the delay sensitive information in an IP packet;

means for fragmenting said IP packet into one or more Frame Relay sub-frames;

means for storing a payload type in a header in each of said sub-frames, said payload type representing that said sub-frames contain at least one IP packet that includes delay sensitive information;

means for storing said sub-frames in one or more Frame Relay frames; and means for transmitting said frames over a Frame Relay network, distinguishing them from frames containing non-delay sensitive information based on said payload type stored in said header of said sub-frames.

4. An apparatus in accordance with claim 3, wherein said means for storing said sub-frames includes:

means for storing each of said sub-frames in a different Frame Relay frame.

5. An apparatus in accordance with claim 3, wherein said means for transmitting step includes:

means for distinguishing said frames from frames containing non-delay sensitive information if the payload type of any of the sub-frames within each frame indicates that the sub-frame is delay sensitive.

6. An apparatus for transmitting delay sensitive information over IP over Frame Relay, including:

means for storing the delay sensitive information in an IP packet;

means for storing said IP packet in a Frame Relay sub-frame;

means for storing a number in an unused portion of a header of said sub-frame representing that said sub-frame contains at least one IP packet that includes delay sensitive information;

means for storing said sub-frame in a Frame Relay frame; and means for transmitting said frame over a Frame Relay network, distinguishing it from frames containing non-delay sensitive information based on said number stored in said unused portion of said header of said sub-frame.

7. An apparatus in accordance with claim 6, wherein said means for transmitting includes:

means for distinguishing said frame from frames containing non-delay sensitive information if the unused portion of any of the sub-frames within said frame indicates that said sub-frame is delay sensitive.

8. An apparatus in accordance with claim 6, wherein said unused portion of said header of said sub-frame is one of the spare fields of said header of said sub-frame.

9. An apparatus for transmitting delay sensitive information over IP over Frame Relay, including:

means for storing the delay sensitive information in an IP packet;

means for fragmenting said IP packet into one or more Frame Relay sub-frames;

means for storing a number in an unused portion of a header in each of said sub-frames, said number representing that said sub-frames contain at least one IP packet that includes delay sensitive information;

means for storing said sub-frames in one or more Frame Relay frames; and means for transmitting said frames over a Frame Relay network, distinguishing them from frames containing non-delay sensitive information based on said number stored in said unused portion of said header of said sub-frames.

10. An apparatus in accordance with claim 9, wherein said means for storing said sub-frames includes means for storing each of said sub-frames in a different Frame Relay frame.

11. An apparatus in accordance with claim 9, wherein said header is an FRF.11 header having spare fields and said unused portion of said header of said sub-frames is one of the spare fields of said FRF.11 header of said sub-frames.

12. An apparatus in accordance with claim 10, wherein said unused portion of said one or more fragments is the control bit field of said header of said sub-frames.

13. An apparatus for transmitting delay sensitive information over IP over Frame Relay, including:

means for storing said delay sensitive information an IP packet;

means for storing said IP packet in a Frame Relay sub-frame;

means for storing a subchannel identification in a header in said sub-frame, said subchannel identification representing that said sub-frame contains at least one IP packet that includes delay sensitive information;

means for storing said sub-frame in said Frame Relay frame; and means for transmitting said frame over a Frame Relay network, distinguishing it from frames containing non-delay sensitive IP information based on said subchannel identification stored in said header of said sub-frame.

14. An apparatus in accordance with claim 13, wherein said means for transmitting includes:

means for distinguishing said frame from frames containing non-delay sensitive information if the subchannel identification of any of the sub-frames within the frame indicates that the sub-frame is delay sensitive.

15. An apparatus for transmitting delay sensitive information over IP over Frame Relay, including:

means for storing the delay sensitive information in an IP packet;

means for fragmenting said IP packet into one or more Frame Relay sub-frames;

means for storing a subchannel identification in a header in each of said sub-frames, said subchannel identification representing that said sub-frames contain at least one IP packet that includes delay sensitive information;

means for storing said sub-frames in one or more Frame Relay frames; and means for transmitting said frames over a Frame Relay network, distinguishing them from frames containing non-delay sensitive IP information based on said subchannel identification stored in said header of said sub-frames.

16. An apparatus in accordance with claim 15, wherein said means for storing said sub-frames includes:

means for storing each of said sub-frames in a different Frame Relay frame.

17. An apparatus for transmitting delay sensitive information over IP over Frame Relay, including:

means for storing the delay sensitive information in an IP packet;

means for storing said IP packet in a Frame Relay sub-frame;

means for storing a network layer protocol identification in said frame, said network layer protocol identification representing that said frame contains at least one IP packet that includes delay sensitive IP information;

means for storing said sub-frame in a Frame Relay frame; and means for transmitting said frame over a Frame Relay network, distinguishing it from frames containing non-IP information and from frames containing non-delay sensitive IP information based on said network layer protocol identification stored in said sub-frame.

18. An apparatus for processing a Frame Relay frame including:

means for examining payload types in headers of each of one or more sub-frames within the frame;

means for determining if information stored in the frame includes at least one IP packet that includes delay sensitive information based on the payload types stored in the headers of the sub-frames within the frame; and means for giving the frame special priority if the frame includes at least one IP packet that includes delay-sensitive information.

19. An apparatus in accordance with claim 18, wherein said means for determining includes:

means for determining that the frame is delay sensitive if the payload type of any of the sub-frames within the frame indicates that a sub-frame within the frame is delay sensitive.

20. An apparatus for handling a Frame Relay frame including:

means for examining an unused portion in headers of each of one or more sub-frames within the frame;

means for determining if information stored in the frame includes at least one IP packet that includes delay sensitive information based on the number stored in the unused portion of the headers of the sub-frames within the frame; and means for giving the frame special priority if the frame includes at least one IP packet that includes delay-sensitive information.

21. An apparatus in accordance with claim 20, wherein said means for determining includes:

means for determining that the frame is delay sensitive if numbers stored in the unused portion of any of the sub-frames within the frame indicates that a sub-frame within the frame is delay sensitive.

22. An apparatus in accordance with claim 20, wherein said header is an FRF.11 header having spare fields and said unused portion is one of the spare fields of the FRF.11 header in each of said sub-frames.

23. An apparatus in accordance with claim 20, wherein said unused portion is a control bit field of each of said sub-frame headers.

24. An apparatus for processing a Frame Relay frame including:

means for examining subchannel identification in headers of each of one or more sub-frames within the frame;

means for determining if information stored in the frame is includes at least one IP packet that includes delay sensitive information based on the subchannel identification stored in the headers of the sub-frames within the frame; and means for giving the frame special priority if the frame includes at least one IP packet that includes delay-sensitive information.

25. An apparatus in accordance with claim 24, wherein said means for determining includes:

means for determining that the frame is delay sensitive if the subchannel identification of any of the sub-frames within the frame indicates that a sub-frame within the frame is delay sensitive.

26. An apparatus in accordance with claim 18 further including means for routing the frame given the special priority prior to routing a frame with a lower priority.

27. An apparatus in accordance with claim 20 further including means for routing the frame given the special priority prior to routing a frame with a lower priority.

28. An apparatus in accordance with claim 24 further including means for routing the frame given the special priority prior to routing a frame with a lower priority.

29. An apparatus for handling a Frame Relay frame including:

means for examining a network layer protocol identification in headers of each of one or more sub-frames within the frame;

means for determining if information stored in the frame is IP information based on the network layer protocol identification stored in the headers of the sub-frames within the frame;

means for determining if the information stored in the frame is delay sensitive based on the network layer protocol identification stored in the headers of the sub-frames within the frame;

means for giving the frame special priority if the frame is delay sensitive; and means for routing the frame given the special priority prior to routing a frame with a lower priority.

30. A program storage device readable by a machine, embodying a program of instructions executable by a machine to perform a method for transmitting delay sensitive information over IP over Frame Relay, the method comprising:

storing the delay sensitive information in an IP packet;

storing said IP packet in a Frame Relay sub-frame;

storing a payload type in a header in said sub-frame, said payload type representing that said sub-frame contains at least one IP packet that includes delay sensitive information;

storing said sub-frame in a Frame Relay frame; and transmitting said frame over a Frame Relay network, distinguishing it from frames containing non-delay sensitive information based on said payload type stored in said header of said sub-frame.

31. The program storage device of claim 30, wherein said transmitting includes:

distinguishing said frame from frames containing non-delay sensitive information if the payload type of any of the sub-frames within said frame indicates that the sub-frame is delay sensitive.

32. A program storage device readable by a machine, embodying a program of instructions executable by a machine to perform a method for transmitting delay sensitive information over IP over Frame Relay, the method comprising:

storing the delay sensitive information in an IP packet;

fragmenting said IP packet into one or more Frame Relay sub-frames;

storing a payload type in a header in each of said sub-frames, said payload type representing that said sub-frames contain at least one IP packet that includes delay sensitive information;

storing said sub-frames in one or more Frame Relay frames; and transmitting said frames over a Frame Relay network, distinguishing them from frames containing non-delay sensitive information based on said payload type stored in said header of said sub-frames, wherein said storing said sub-frames includes storing each of said sub-frames in a different Frame Relay frame.

33. A program storage device readable by a machine, embodying a program of instructions executable by a machine to perform a method for transmitting delay sensitive information over IP over Frame Relay, the method comprising:

storing the delay sensitive information in an IP packet;

fragmenting said IP packet into one or more Frame Relay sub-frames;

storing a payload type in a header in each of said sub-frames, said payload type representing that said sub-frames contain at least one IP packet that includes delay sensitive information;

storing said sub-frames in one or more Frame Relay frames; and transmitting said frames over a Frame Relay network, distinguishing them from frames containing non-delay sensitive information based on said payload type stored in said header of said sub-frames, wherein said transmitting includes distinguishing said frames from frames containing non-delay sensitive information if the payload type of any of the sub-frames within each frame indicates that the sub-frame is delay sensitive.

34. A program storage device readable by a machine, embodying a program of instructions executable by a machine to perform a method for transmitting delay sensitive information over IP over Frame Relay, including:

storing the delay sensitive information in an IP packet;

storing said IP packet in a Frame Relay sub-frame;

storing a number in an unused portion of a header of said sub-frame representing that said sub-frame contains at least one IP packet that includes delay sensitive information;

storing said sub-frame in a Frame Relay frame; and transmitting said frame over a Frame Relay network, distinguishing it from frames containing non-delay sensitive information based on said number stored in said unused portion of said header of said sub-frame.

35. The program storage device of claim 34, wherein said transmitting includes:

distinguishing said frame from frames containing non-delay sensitive information if the unused portion of any of the sub-frames within said frame indicates that said sub-frame is delay sensitive.

36. The program storage device of claim 34, wherein said unused portion of said header of said sub-frame is one of the spare fields of said header of said sub-frame.

37. A program storage device readable by a machine, embodying a program of instructions executable by a machine to perform a method for transmitting delay sensitive information over IP over Frame Relay, including:

storing the delay sensitive information in an IP packet;

fragmenting said IP packet into one or more Frame Relay sub-frames;

storing a number in an unused portion of a header in each of said sub-frames, said number representing that said sub-frames contain at least one IP packet that includes delay sensitive information;

storing said sub-frames in one or more Frame Relay frames; and transmitting said frames over a Frame Relay network, distinguishing them from frames containing non-delay sensitive information based on said number stored in said unused portion of said header of said sub-frames.

38. The program storage device of claim 37, wherein said storing said sub-frames includes storing each of said sub-frames in a different Frame Relay frame.

39. The program storage device of claim 37, wherein said header is an FRF.11 header having spare fields and said unused portion of said header of said sub-frames is one of the spare fields of said FRF.11 header of said sub-frames.

40. The program storage device of claim 38, wherein said unused portion of said one or more fragments is the control bit field of said header of said sub-frames.

41. A program storage device readable by a machine, embodying a program of instructions executable by a machine to perform a method for transmitting delay sensitive information over IP over Frame Relay, including:

storing said delay sensitive information an IP packet;
storing said IP packet in a Frame Relay sub-frame;
storing a subchannel identification in a header in said sub-frame, said subchannel identification representing that said sub-frame contains at least one IP packet that includes delay sensitive information;
storing said sub-frame in said Frame Relay frame; and
transmitting said frame over a Frame Relay network, distinguishing it from frames containing non-delay sensitive IP information based on said subchannel identification stored in said header of said sub-frame,
wherein said transmitting includes distinguishing said frame from frames containing non-delay sensitive information if the subchannel identification of any of the sub-frames within the frame indicates that the sub-frame is delay sensitive.

42. A program storage device readable by a machine, embodying a program of instructions executable by a machine to perform a method for transmitting delay sensitive information over IP over Frame Relay, including:
storing the delay sensitive information in an IP packet;
fragmenting said IP packet into one or more Frame Relay sub-frames;
storing a subchannel identification in a header in each of said sub-frames, said subchannel identification representing that said sub-frames contain at least one IP packet that includes delay sensitive information:
storing said sub-frames in one or more Frame Relay frames; and
transmitting said frames over a Frame Relay network, distinguishing them from frames containing non-delay sensitive IP information based on said subchannel identification stored in said header of said sub-frames,
wherein said storing said sub-frames includes storing each of said sub-frames in a different Frame Relay frame.

43. A program storage device readable by a machine, embodying a program of instructions executable by a machine to perform a method for processing a Frame Relay including:
examining payload types in headers of each of one or more sub-frames within the frame;
determining if information stored in the frame includes at least one IP packet that includes delay sensitive information based on the payload types stored in the headers of the sub-frames within the frame; and
giving the frame special priority if the frame includes at least one IP packet that includes delay-sensitive information.

44. The program storage device of claim 43, wherein said determining includes:
determining that the frame is delay sensitive if the payload type of any of the sub-frames within the frame indicates that a sub-frame within the frame is delay sensitive.

45. A program storage device readable by a machine, embodying a program of instructions executable by a machine to perform a method for transmitting delay sensitive information over IP over Frame Relay, handling a Frame Relay frame including the steps of:
examining an unused portion in headers of each of one or more sub-frames within the frame;
determining if information stored in the frame includes at least one IP packet that includes delay sensitive information based on the number stored in the unused portion of the headers of the sub-frames within the frame; and
giving the frame special priority if the frame includes at least one IP packet that includes delay-sensitive information.

46. The program storage device of claim 45, wherein said determining includes:
determining that the frame is delay sensitive if numbers stored in the unused portion of any of the sub-frames within the frame indicates that a sub-frame within the frame is delay sensitive.

47. The program storage device of claim 45, wherein said header is an FRF.11 header having spare fields and said unused portion is one of the spare fields of the FRF.11 header in each of said sub-frames.

48. The program storage device of claim 45, wherein said unused portion is a control bit field of each of said sub-frame headers.

49. A program storage device readable by a machine, embodying a program of instructions executable by a machine to perform a method for processing a Frame Relay, processing a Frame Relay frame including:
examining subchannel identification in headers of each of one or more sub-frames within the frame;
determining if information stored in the frame is includes at least one IP packet that includes delay sensitive information based on the subchannel identification stored in the headers of the sub-frames within the frame; and
giving the frame special priority if the frame includes at least one IP packet that includes delay-sensitive information.

50. The program storage device of claim 49, wherein said determining includes:
determining that the frame is delay sensitive if the subchannel identification of any of the sub-frames within the frame indicates that a sub-frame within the frame is delay sensitive.

51. A program storage device readable by a machine, embodying a program of instructions executable by a machine to perform a method for handling a Frame Relay frame including:
examining a network layer protocol identification in headers of each of one or more sub-frames within the frame;
determining if information stored in the frame is IP information based on the network layer protocol identification stored in the headers of the sub-frames within the frame;
determining if the information stored in the frame delay sensitive based on the network layer protocol identification stored in the headers of the sub-frames within the frame; and
giving the frame special priority if the frame is delay sensitive.

52. The program storage device of claim 43, further including routing the frame given the special priority prior to routing a frame with a lower priority.

53. The program storage device of claim 45, further including routing the frame given the special priority prior to routing a frame with a lower priority.

54. The program storage device of claim 49, further including routing the frame given the special priority prior to routing a frame with a lower priority.

55. The program storage device of claim 51, further including routing the frame given the special priority prior to routing a frame with a lower priority.

56. An apparatus to transmit delay sensitive information over IP over Frame Relay, comprising:

means for storing the delay sensitive information in an IP packet;

means for storing said IP packet in a Frame Relay sub-frame;

means for storing a payload type in a header in said sub-frame, said payload type representing that said sub-frame contains delay sensitive information; and means for storing said sub-frame in a Frame Relay frame.

57. The apparatus of claim 56 further comprising means for distinguishing said frame from frames containing non-delay sensitive information if the payload type of any of the sub-frames within said frame indicates that the sub-frame is delay sensitive.

58. The apparatus of claim 56 further comprising means for fragmenting said IP packet.

59. The apparatus of claim 56 further comprising means for storing each of said sub-frames in a different Frame Relay frame.

60. An apparatus to transmit delay sensitive information over IP over Frame Relay, comprising:

a generator to generate an IP packet to store delay sensitive information;

means for placing a Frame Relay sub-frame within said IP packet;

a number placed in an unused portion of a header of said Frame Relay sub-frame representing that said Frame Relay sub-frame contains delay sensitive information.

61. The apparatus of claim 60 further comprising means for distinguishing said Frame Relay sub-frame from other frames containing non-delay sensitive information if the payload type of any of the sub-frames within said Frame Relay sub-frame indicates that said Frame Relay sub-frame is delay sensitive.

62. The apparatus of claim 60 wherein said unused portion of said header of said Frame Relay sub-frame is one of the spare fields of said header of said Frame Relay sub-frame.

63. An apparatus for transmitting delay sensitive information over IP over Frame Relay, said apparatus comprising:

a generator to generate an IP packet to store the delay sensitive information;

means for fragmenting said IP packet into one or more Frame Relay sub-frames;

said Frame Relay sub-frames each having a number placed in an unused portion of a header of said respective Frame Relay sub-frames representing that said respective Frame Relay sub-frames contain delay sensitive information.

64. The apparatus of claim 63 further comprising means for storing each of said Frame Relay sub-frames in a different Frame Relay frame.

65. The apparatus of claim 63 wherein said header of said respective Frame Relay sub-frames is an FRF.11 header having spare fields and said unused portion of said header of said respective Frame Relay sub-frames is one of the spare fields of said FRF.11 header of said respective Frame Relay sub-frames.

66. The apparatus of claim 63 wherein said unused portion of said one or more Frame Relay sub-frames is a control bit field of said header of said Frame Relay sub-frames.

67. An apparatus to transmit delay sensitive information over IP over Frame Relay, comprising:

means for storing said delay sensitive information in an IP packet;

means for storing said IP packet in a Frame Relay sub-frame;

means for storing a subchannel identification in a header in said sub-frame, said subchannel identification representing that said sub-frame contains delay sensitive information; and means for storing said sub-frame in said Frame Relay frame.

68. The apparatus of claim 67 further comprising means to distinguish said frame from frames containing non-delay sensitive information if the subchannel identification of any of the sub-frames within said frame indicates that the sub-frame is delay sensitive.

69. An apparatus to transmit delay sensitive information over IP over Frame Relay, comprising:

a generator to generate an IP packet for storing the delay sensitive information;

means for fragmenting said IP packet into one or more Frame Relay sub-frames;

said sub-frames each having a subchannel identification in a header in each of said sub-frames, said subchannel identification representing that said sub-frames contain delay sensitive information; and means for storing said sub-frame in said Frame Relay frame.

70. The apparatus of claim 69 further comprising means for storing each of said sub-frames in a different Frame Relay frame.

71. An apparatus to transmit delay sensitive information over IP over Frame Relay, comprising:

means for storing the delay sensitive information in an IP packet;

means for storing said IP packet in a Frame Relay sub-frame;

means for storing a network layer protocol identification in said frame, said network layer protocol identification representing that said frame contains delay sensitive IP information; and means for storing said sub-frame in a Frame Relay frame.

72. An apparatus for processing a Frame Relay frame, comprising:

means for examining subchannel identification in headers of each of one or more sub-frames within the frame;

means for determining if information stored in the frame is delay sensitive based on the subchannel identification stored in the headers of the sub-frames within the frame; and means for giving the frame special priority if the frame is delay-sensitive, wherein said means for determining determines that the frame is delay sensitive if the subchannel identification of any of the sub-frames within the frame indicates that a sub-frame within the frames is delay sensitive.

73. A program storage device readable by a machine, tangibly embodying a program of instructions executable by the machine to perform a method for transmitting delay sensitive information in an IP packet;

storing said IP packet in a Frame Relay sub-frame;

storing a payload type in a header in said sub-frame, said payload type representing that said sub-frame contains delay sensitive information; and storing said sub-frame in a Frame Relay frame.

74. A program storage device readable by a machine, tangibly embodying a program of instructions executable by the machine to perform a method for transmitting delay sensitive information of IP over Frame Relay, said method comprising:

storing the delay sensitive information in an IP packet;

fragmenting said IP packet into one or more Frame Relay sub-frames;

storing a payload type in a header in each of said sub-frames, said payload type representing that said sub-frames contain delay sensitive information;

storing said sub-frames in one or more Frame Relay frames; and transmitting said frames over a Frame Relay network, distinguishing them from frames containing non-delay sensitive information based on said payload type stored in said header of said sub-frames.

75. A program storage device readable by a machine, tangibly embodying a program of instructions executable by the machine to perform a method for transmitting delay sensitive information of IP of Frame Relay, said method comprising:

storing the delay sensitive information in an IP packet;

storing said IP packet in a Frame Relay sub-frame;

storing a number in an unused portion of a header of said sub-frame representing that said sub-frame contains delay sensitive information;

storing said sub-frame in a Frame Relay frame; and transmitting said frame over a Frame Relay network, distinguishing it from frames containing non-delay sensitive information based on said number stored in said unused portion of said header of said sub-frame.

76. A program storage device readable by a machine, tangibly embodying a program of instructions executable by the machine to perform a method for transmitting delay sensitive information executable by the machine to perform a method for transmitting delay sensitive information of IP of Frame Relay, said method comprising:

storing the delay sensitive information in an IP packet;

fragmenting said IP packet into one or more Frame Relay sub-frames;

storing a number in an unused portion of a header in each of said sub-frames, said number representing that said sub-frames contain delay sensitive information;

storing said sub-frames in one or more Frame Relay frames; and transmitting said frames over a Frame Relay network, distinguishing them from frames containing non-delay sensitive information based on said number stored in said unused portion of said header of said sub-frames.

77. A program storage device readable by a machine, tangibly embodying a program of instructions executable by the machine to perform a method for transmitting delay sensitive information of IP over Frame Relay, said method comprising:

storing delay sensitive information in an IP packet;

stroring said IP packet in a frame Relay sub-frame;

storing a subchannel identification in a header in said sub-frame, said subchannel identification representing that said sub-frame contains delay sensitive information;

storing said sub-frame in said Frame Relay frame; and transmitting said frame over a Frame Relay network, distinguishing it from frames containing non-delay sensitive IP information based on said subchannel identification stored in said header of said sub-frame.

78. A program storage device readable by a machine, tangibly embodying a program of instructions executable by the machine to perform a method for transmitting delay sensitive information of IP of Frame Relay, said method comprising:

storing the delay sensitive information in an IP packet;

fragmenting said IP packet into one or more Frame Relay sub-frames;

storing subchannel identification in a header in each of said sub-frames, said subchannel identification representing that said sub-frames contain delay sensitive information;

storing said sub-frames in one or more Frame Relay frames; and transmitting said frames over a Frame Relay network, distinguishing them from frames containing non-delay sensitive IP information based on said subchannel identification stored in said header of said sub-frames.

79. A program storage device readable by a machine, tangibly embodying a program of instructions executable by the machine to perform a method for transmitting delay sensitive information of IP of Frame Relay, said method comprising:

storing the delay sensitive information in an IP packet;

stroring said IP packet in a Frame Relay sub-frame;

storing a network layer protocol identification in said frame, said network layer protocol identification representing that said frame contains delay sensitive IP information;

storing said sub-frame in a Frame Relay frame; and transmitting said frame over a Frame Relay network, distinguishing it from frames containing non-IP information and from frames containing non-delay sensitive IP information based on said network layer protocol identification stored in said sub-frame.

\* \* \* \* \*

UNITED STATES PATENT AND TRADEMARK OFFICE
CERTIFICATE OF CORRECTION

PATENT NO. : 6,594,278 B1
DATED : July 15, 2003
INVENTOR(S) : Mihyar Baroudi

It is certified that error appears in the above-identified patent and that said Letters Patent is hereby corrected as shown below:

<u>Title page, Item [54] and Column 1, line 2,</u>
Replace "OVER FRAME" with -- OVER IP OVER FRAME --.

<u>Column 3,</u>
Line 65, replace "The extending address" with -- The extended address --

<u>Column 5,</u>
Line 65, replace "in frame for" with -- in frames for --.

<u>Column 6,</u>
Line 54, replace "Relay, ore more" with -- Relay, or more --.

<u>Column 7,</u>
Line 16, replace "(since very sub-frame" with -- (since every sub-frame --.

<u>Column 10,</u>
Line 12, replace "In more cases," with -- In most cases, --.

<u>Column 11,</u>
Line 7, replace "IP jacket." with -- IP packet. --.
Line 50, replace "router with" with -- router within --.

<u>Column 13,</u>
Line 16, replace "network protocol" with -- network layer protocol --.
Line 28, replace "describ" with -- describe --.

<u>Column 14,</u>
Line 50, replace "generate with Frame" with -- generate with either Frame --.

UNITED STATES PATENT AND TRADEMARK OFFICE
CERTIFICATE OF CORRECTION

PATENT NO. : 6,594,278 B1
DATED : July 15, 2003
INVENTOR(S) : Mihyar Baroudi

It is certified that error appears in the above-identified patent and that said Letters Patent is hereby corrected as shown below:

<u>Column 15,</u>
Line 4, replace "522" with -- 552 --.

<u>Column 25,</u>
Lines 36-37, delete "executable by the machine to perform a method for transmitting delay sensitive information".

Signed and Sealed this

Seventeenth Day of February, 2004

JON W. DUDAS
*Acting Director of the United States Patent and Trademark Office*